GEAR GRINDING MACHINE

Inventor
WILLIAM C. CRITCHLEY
HERMAN A. MALE

By B. Schlesinger
Attorney

Inventor
WILLIAM C. CRITCHLEY
HERMAN A. MALE
By
Attorney

Sept. 4, 1951

W. C. CRITCHLEY ET AL 2,566,402

GEAR GRINDING MACHINE

Filed Oct. 23, 1948

17 Sheets-Sheet 3

Inventor
WILLIAM C. CRITCHLEY
HERMAN A. MALE

By [signature]

Attorney

Inventor
WILLIAM C. CRITCHLEY
HERMAN A. MALE
B. E. Schlesinger
Attorney

Inventor
WILLIAM C. CRITCHLEY
HERMAN A. MALE
By B. Eshlbringer
Attorney

Sept. 4, 1951 W. C. CRITCHLEY ET AL 2,566,402

GEAR GRINDING MACHINE

Filed Oct. 23, 1948 17 Sheets-Sheet 6

Inventor
WILLIAM C. CRITCHLEY
HERMAN A. MALE

By B. Schlesinger
Attorney

Inventor
WILLIAM C. CRITCHLEY
HERMAN A. MALE

By [signature]
Attorney

Sept. 4, 1951 W. C. CRITCHLEY ET AL 2,566,402

GEAR GRINDING MACHINE

Filed Oct. 23, 1948 17 Sheets-Sheet 8

Inventor
WILLIAM C. CRITCHLEY
HERMAN A. MALE

By [signature]
Attorney

Inventor
WILLIAM C. CRITCHLEY
HERMAN A. MALE

By [signature]
Attorney

Sept. 4, 1951 W. C. CRITCHLEY ET AL 2,566,402

GEAR GRINDING MACHINE

Filed Oct. 23, 1948 17 Sheets-Sheet 10

Inventor
WILLIAM C. CRITCHLEY
HERMAN A. MALE

By [signature]

Attorney

Sept. 4, 1951 W. C. CRITCHLEY ET AL 2,566,402

GEAR GRINDING MACHINE

Filed Oct. 23, 1948 17 Sheets-Sheet 11

Inventor

WILLIAM C. CRITCHLEY

HERMAN A. MALE

By B. Schlesinger

Attorney

Sept. 4, 1951 W. C. CRITCHLEY ET AL 2,566,402

GEAR GRINDING MACHINE

Filed Oct. 23, 1948 17 Sheets-Sheet 12

Inventor

WILLIAM C. CRITCHLEY
HERMAN A. MALE

By [signature]

Attorney

Sept. 4, 1951 W. C. CRITCHLEY ET AL 2,566,402

GEAR GRINDING MACHINE

Filed Oct. 23, 1948 17 Sheets-Sheet 13

Inventor

WILLIAM C. CRITCHLEY
HERMAN A. MALE

By B. E. Schlesinger

Attorney

Inventors
WILLIAM C. CRITCHLEY
HERMAN A. MALE
By [signature] Attor

Inventor

WILLIAM C. CRITCHLEY
HERMAN A. MALE

By [signature] Attorney

Sept. 4, 1951 W. C. CRITCHLEY ET AL 2,566,402

GEAR GRINDING MACHINE

Filed Oct. 23, 1948 17 Sheets-Sheet 16

Inventor
WILLIAM C. CRITCHLEY
HERMAN A. MALE

By [signature]
Attorney

Sept. 4, 1951 W. C. CRITCHLEY ET AL 2,566,402

GEAR GRINDING MACHINE

Filed Oct. 23, 1948 17 Sheets-Sheet 17

Inventor

WILLIAM C. CRITCHLEY
HERMAN A. MALE

By [signature]

Attorney

Patented Sept. 4, 1951

2,566,402

UNITED STATES PATENT OFFICE 2,566,402

GEAR GRINDING MACHINE

William C. Critchley and Herman A. Male, Brighton, N. Y., assignors to Gleason Works, Rochester, N. Y., a corporation of New York Application October 23, 1948, Serial No. 56,144

31 Claims. (Cl. 51—33)

The present invention relates to machines for producing gears and more particularly to machines for grinding spiral bevel and hypoid gears in a generating operation. In a still more specific aspect, the invention relates to machines for this purpose which are fully automatic in operation.

In machines for grinding spiral bevel and hypoid gears in a generating operation, the tool ordinarily used is an angular grinding wheel, and the grinding of the tooth sides of the work is accomplished by rotating the wheel in engagement with the work while effecting a relative rolling motion between the wheel and work as though the gear, which is being ground, were rolling with a basic gear or with a mate gear of which the wheel represents a tooth. The rolling motion is achieved by mounting the wheel or the work, usually the wheel, on a rotary cradle and rotating the wheel in engagement with the work while rotating the cradle and work on their respective axes in proper timed relation. The wheel is mounted for angular adjustment so that its axis may be inclined to the axis of the cradle to represent a tooth of any basic gear or of the mate of the gear being ground.

Ordinarily, at least a rough-grinding and a finish-grinding operation are performed on each tooth side of the work. Where gears are ground from the solid, many rough-grinding operations are required prior to finish-grinding in order to remove the stock and completely generate the tooth spaces of the work.

If more than one rough-grinding operation is necessary, the work must be advanced relative to the wheel between successive rough-grinding operations so that on each successive rough-grinding operation, the wheel may grind deeper into the work. Between rough-grinding and finish-grinding operations, moreover, the wheel is always dressed, and, if there are many rough-grinding operations to be performed, as when a gear is to be ground from the solid, it is the practice to dress the wheel also one or more times while rough-grinding to prevent the wheel from loading up and to keep it coarse enough to rough-grind the tooth sides fast without burning.

Machines have been built for effecting all these operations automatically and in proper sequence. In the machines heretofore built, however, the step-by-step feed of the work into the wheel after successive rough-grinding operations is controlled by a stepped member which is very difficult to make accurately.

In all known machines for grinding spiral bevel or hypoid gears, whether manually or automatically operated, moreover, the feed of the work for depth of grind is in the direction of the axis of the cradle. Where the axis of the grinding wheel is parallel to the axis of the cradle and the wheel is of equal pressure angle on both sides, equal wear on both the inside and outside surfaces of the wheel will be obtained with such a feed. Where the wheel has to be dressed, however, to have unequal pressure angles on opposite sides, as for grinding a hypoid pinion, for instance, or has to be adjusted so that its axis is inclined to the cradle axis, the two sides of the wheel will be subjected to unequal wear with the result that one will wear more rapidly than the other and the wheel will have to be dressed unnecessary amounts on the side of less wear in order that sufficient stock be removed all around the wheel to provide a keen surface on the side of greater wear. The life of a wheel is, therefore, materially reduced. In addition, where the wheel has unequal pressure angles on opposite sides, the wheel clearance may be reduced to such an extent on one side as to tend to burn the work.

In any grinding machine, the wheel has to be driven at high speed. In spiral bevel and hypoid gear grinders with a tilting wheel adjustment one of the great difficulties in design is to get a satisfactory drive to the wheel in all of the various positions to which the wheel may be adjusted on the cradle for grinding a gear of the desired spiral and pressure angles and conjugate to a basic or mate gear of a prescribed pitch cone angle.

One object of the present invention is to provide a machine for grinding spiral bevel or hypoid gears which will be fully automatic in operation but simpler in construction than previous types of such machines.

Another object of the invention is to provide a machine of this character in which the feed of the work into the wheel may be controlled through simple cams which can be rotated step-by-step to effect the advance of the work into the wheel and which can readily be adjusted prior to the grinding operation for any desired number of feed steps.

Another object of the invention is to provide a universal type of generating bevel and hypoid gear grinder in which a simplified wheel mounting is obtained and in which the wheel may be driven directly from its motor without the intervention of any train of gearing.

A further object of the invention is to provide a universal type spiral bevel and hypoid gear grinder in which the direct drive of the motor may be attained while securing the adjustments required for grinding spiral bevel gears of different spiral angles, hands, and pressure angles, and for generating such gears conjugate to different basic gears represented by the wheel.

A further object of the invention is to provide a machine for grinding spiral bevel and hypoid gears in which the work may be adjusted so that it can always be fed in a direction bisecting the angle between opposite sides of the grinding wheel thereby to attain maximum wheel life.

In another aspect it is a further object of this invention to provide a spiral bevel and hypoid gear generating machine of the intermittent indexing type in which the generating motion may be controlled by a barrel-type cam as in the gear cutting machine of the Stewart and Carlsen U. S. patent application Serial No. 779,890, filed October 15, 1947, which in general will be geared like the Stewart and Carlsen machine, and in which the improvements in mounting of the tool, indexing mechanism, etc., of the machine of that application may be employed.

In cutting or grinding spiral bevel and hypoid gears it is usual to cut or grind the tooth spaces so that they decrease in depth from their outer to their inner ends. When both members of the pair are cut or ground in this way with a face-mill cutter or annular grinding wheel, the mating gears will mesh with so-called "bias bearing" unless steps are taken to obviate such a tooth bearing or contact. One way in which "bias bearing" may be eliminated is by generating both members of the pair with a helical motion. This is the conventional method where both members of the gear pair have opposite sides of their tooth spaces cut or ground simultaneously with taper in depth.

Helical motion is achieved by feeding the wheel or work depthwise during generation and in time with the generating motion. This may be achieved in a standard machine by using a special cam which will not only affect alternate feed and withdrawal of the work relative to tool at the beginning and end of a cutting or grinding cycle in a tooth space, but which will also produce a feed movement during the cutting or grinding cycle. In any kind of spiral bevel or hypoid gear generator, use of a helical motion requires, therefore, a special feed cam. In a machine built according to the Stewart et al. application, the feed cam is integral with the generating cam so it is all the more bothersome to change cams and all the more expensive.

Another object of the present invention is to provide a simple means for effecting helical feed of the work during cutting or grinding which may be operated in time with the cradle movement and from the cradle and without requiring any special cam.

Still another object of the invention is to provide a machine in which the helical motion may be effected without requiring any change of the cam that produces the alternate movement of the work into and out of operative position, and independently thereof.

A further object of the invention is to provide a helical feed mechanism for a gear grinding machine of the generating type which is so connected to the step-by-step feed mechanism of the machine as to employ many parts common therewith.

A still further object of the invention is to provide a gear grinding machine of the generating type in which the mechanism for moving the work to and from loading position, the mechanism for moving the work to and from operative position, the helical motion mechanism, and the step-by-step feed mechanism all operate through certain common parts and achieve movement of the sliding base, which supports the work, through a common connection.

Other objects of the invention will be apparent hereinafter from the specification and from the recital of the appended claims.

An automatic spiral bevel and hypoid gear grinding machine built according to the present invention operates basically like previous such automatic grinders. When the work is in working position, it is moved into operative relation with the rotating grinding wheel; the wheel and work are rolled together to grind in a tooth space of the work; the work is withdrawn from engagement with the wheel; and the work is indexed. Then the work is moved back into engagement with the wheel and grinding in the new tooth space is effected as before. So the operation proceeds until a grinding operation has been effected in all the tooth spaces of the work. Then the wheel may either be fed further into the work and the tooth surfaces may be reground but at greater depth; or, if the wheel is to be dressed between successive grindings, the work may be withdrawn from working position, the wheel advanced and dressed, and then the work may be fed further into depth and the grinding cycle resumed.

In the present machine the cycle of operations is controlled by a rotary drum which is advanced step-by-step between successive grinding operations. This drum carries cams which control the operations of valves that control the dressing of the wheel, the work feed advancing mechanism, and the movements between working and loading positions of the sliding base on which the work is mounted.

The work feed advancing mechanism itself is unique. Feed advance of the work is accomplished by step-by-step movement of a rotary cam whose peripheral surface is wholly or largely eccentric of its axis. This cam engages a follower connected to the sliding base of the machine; and the radius to the peripheral portion of the cam, which is at any time in engagement with the follower, determines the depth position of the work. The total angle through which the cam is rotated determines, moreover, the total depth to which the work is ground; and different depths of grind may be obtained simply by varying the angle of total movement of the cam. With a few cams having cam surfaces arranged on curves of different eccentricities, then, all of the work within the capacity of the machine can be ground.

Figure 2:
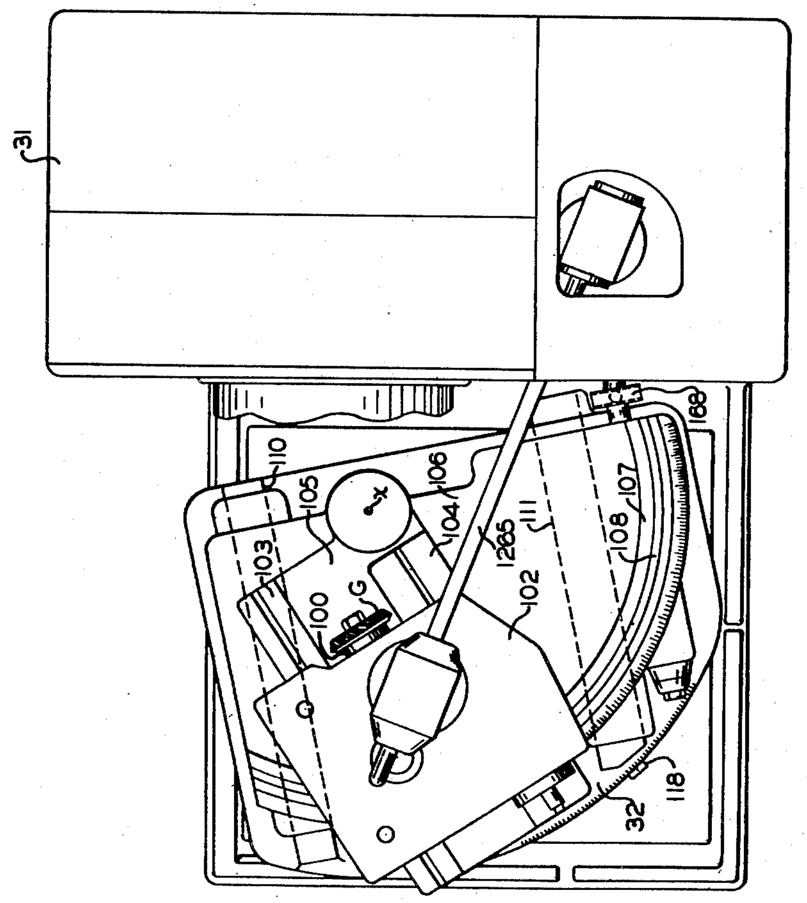
Fig. 2 is a plan view of the machine with parts broken away.
Figure 3:
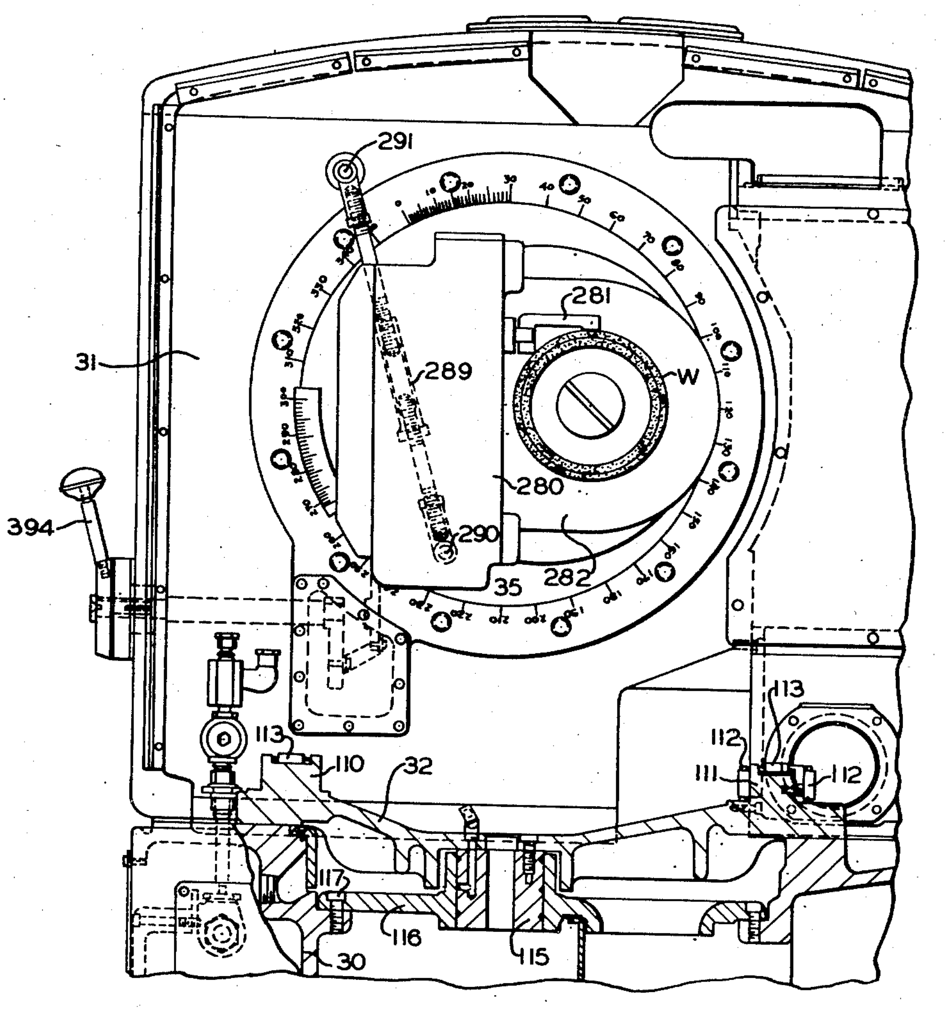
Fig. 3 is a vertical sectional view through the machine, looking at the face of the tool carrying cradle.

Referring now to the drawings by numerals of reference, 30 denotes the bed of the machine. Secured to the bed at one end thereof is the cradle housing 31 (Fig. 3). Mounted on the bed at the other end thereof for angular adjustment thereon is a sub-base 32 (Fig. 2).

Journaled in the housing 31 on anti-friction bearings 33 and 34 (Fig. 4) is the cradle 35. Mounted in a cylindrical plain bearing 36 formed adjacent the front end of the cradle 35 is a drum 40 which is rotatably adjustable in the cradle through an angle of 360° about an axis eccentric to the axis of the cradle. Journaled in the drum 40 on spaced plain bearings 41 and 42 for rotatable adjustment through an angle of 360° about an axis eccentric to the axis of the drum is a swivel head or eccentric 45. Journaled in the swivel head 45 on plain bearings 46 and 47 for rotatable adjustment through an angle of 360° about an axis angularly inclined to the axis of the swivel head is a carrier 50. Mounted in the carrier 50 on an axially reciprocable type sleeve bearing 51 is a slide or sleeve 53 to which the wheel drive motor 55 is secured. To the armature shaft 56 of this motor there is secured the grinding wheel W. The armature shaft 56 of the motor is journaled on anti-friction bearings 57 and 58 in the frame ends of the motor. The wheel W may be secured by a nut 59 and plate 60 to the hub member 61 which is keyed to armature shaft 56.

The mountings of the drum 40 in the cradle, of the swivel head or eccentric in the drum, and of the carrier in the swivel head or eccentric are similar to the mountings of the corresponding parts in the machine of the Stewart & Carlsen U. S. application Serial No. 779,890 above referred to and are for the same purpose. They permit of adjusting the tool, which here is a grinding wheel, to represent gears of different pitch cone angles, pressure angles, and spiral angles so that a gear may be ground to be conjugate thereto. The adjustments of these various parts may be effected in the same way as in the Stewart and Carlsen application and for that reason will not be described here in detail.

Figure 19:
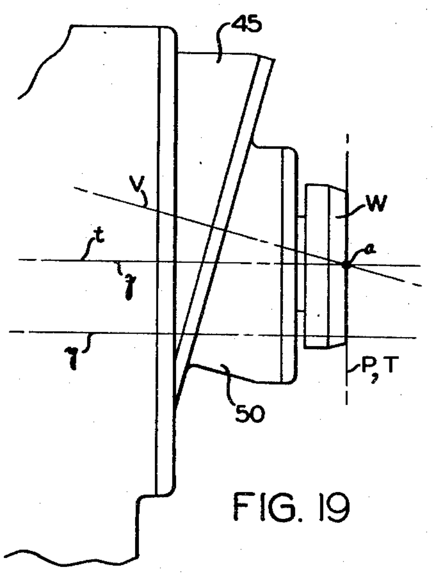
Figs. 19 and 20 are diagrammatic views showing different positions to which the grinding wheel may be adjusted by the wheel adjustments of the present machine.

Fig. 19 illustrates diagrammatically the zero position of angular adjustment of the wheel. Here the axis $t$ of the wheel spindle 56 (Fig. 4) is parallel to the axis $y$ of the cradle 35 and coincides with the axis $z$ of the eccentric drum 40. $v$ denotes the axis of the swivel head 45. This axis is inclined to and intersects the axis $t$ of the wheel spindle. The point of such intersection is denoted at $a$. It lies in the central plane P of the machine.

Figure 20:
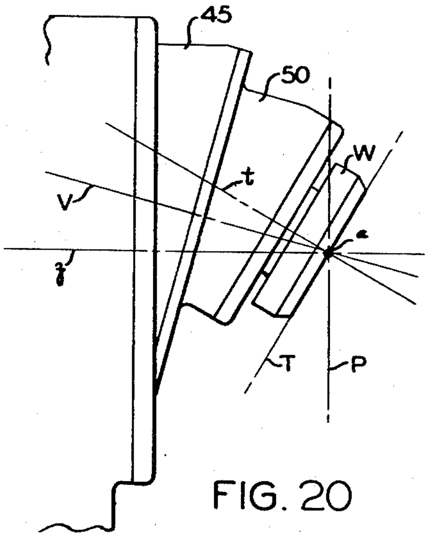

Fig. 20 illustrates diagrammatically an extreme position of adjustment of the grinding wheel. Here the wheel carrier 50 has been swung about the axis $v$ through 180°. Axis $t$ of the wheel spindle is now inclined to the axis $v$ of swivel head 45, and the wheel spindle has been swung far enough about cone center $a$ that the axis $v$ of the swivel head 45 bisects the angle between the axes $z$ and $t$. Plane T of the tip of the grinding wheel is now inclined to the central plane P of the machine. By tilting the wheel about the point $a$ of intersection of the swivel head and the wheel axis, the angle of tilt required for the wheel can be computed directly. This makes for simplified calculation as compared with prior types of machines for grinding spiral bevel and hypoid gears.

When the wheel is in the zero position of its adjustment, it may represent a nominal crown gear, that is, a basic gear having a face cone angle of 90° but a pitch angle of slightly less than 90°. Here the axis $t$ of the wheel is parallel to the axis $y$ of the cradle and the tip surface T of the wheel lies in the face plane of the crown gear. When the wheel is in this position, tooth surfaces will be generated on the gear being ground which are conjugate to the nominal crown gear.

By adjusting the swivel head 45 and the cutter carrier 50, the wheel can be positioned to represent a tapered gear which has a pitch angle of considerably less than 90°, and the gear, which is to be ground, can be generated conjugate to such a gear which may be its mate. With these same adjustments, the wheel can be positioned to grind a gear of a different pressure angle from the pressure angle of the wheel. Usually, however, the wheel itself is dressed to the desired pressure angle instead of being adjusted angularly.

The angular adjustments of the eccentric 40 and of the cradle 35 permit of representing a generating gear of any spiral angle. The adjustment of the eccentric 40 gives the desired radial position of the wheel axis with reference to the axis of the cradle and the adjustment of the cradle brings the wheel into the desired angular position about the cradle axis.

For supplying electric current to the wheel drive motor 55 a commutator 63 (Fig. 4) is provided. This is secured against rotation to a supporting member 64 which is fastened by screws 65 to the cradle. A ring or annulus 66 is rotatably mounted on supporting member 64. The terminals 67 for the outside source of current are secured in this annulus. The supporting member 64 is drilled to receive the wires which connect commutator 63 with terminals 68; and wires housed within a cable 69 connect these terminals with the motor.

To compensate for wear, the grinding wheel together with its drive motor is adapted to be advanced axially. The mechanism for effecting this feed movement of the grinding wheel will now be described.

Secured to the carrier 50 as by means of screws 71 (Fig. 4) is a block 70 (Figs. 4, 5 and 7) which forms a cylinder in which the piston 73 is reciprocally mounted. This piston is connected through the piston rod 74 and pin 75 with an arm 76 which is rotatably mounted upon the hub of a ratchet wheel 77. The ratchet wheel is keyed to a screw shaft 78 (Figs. 5 and 6) that is itself journaled in the carrier 50.

Pivotally mounted on a pin 79 in the arm 76 is a pawl 80 that is adapted to engage the teeth of the ratchet wheel 77. The pawl 80 is held in engagement with the teeth of the ratchet wheel by spring-pressed plunger 81 which is housed in the arm 76. A stud 82, that engages the tail of the pawl, serves to disengage the pawl from the ratchet wheel on the return swing of arm 76 on reverse movement of piston 73. This stud is secured in the same block 70 which houses the piston 73.

The screw shaft 78 threads into a split nut 85. Flanges on the two parts of this nut abut against opposite sides of a lug 86 and one of these flanges is secured to lug 86 by screws 84. Lug 86 is fastened by welding or in any other suitable manner to the sleeve 53 to which wheel drive motor 55 is secured. The screw shaft 78 is journaled at one end in an anti-friction bearing 87 and at its opposite end in a plain bearing 88 in the carrier 50.

Obviously, upon reciprocation of the piston 73, the arm 76 is oscillated on the hub of the ratchet wheel 77 to rotate the ratchet wheel and through the ratchet to rotate the screw shaft 78, thus moving the grinding wheel axially.

The stroke of the piston 73 is adjustably limited by a stop member 90, which has a plurality of stop surfaces 91 formed on it at different distances from its axis. This stop member fits into a slabbed-off portion of the piston rod 74 and is adapted to engage the shoulder 94 formed on the piston rod by this slabbed-off portion. The stop member 90 is secured to a stud 92 which is rotatable in the carrier 50 so as to adjust one of the stop surfaces 91 into operative position. A spring pressed detent 93, which serves to engage the stud, holds the stop member 90 in any adjusted position. The front end of the stud 92 may be graduated for ease in setting stop member 90.

Through adjustment of the stop member, the arc of swing of arm 76 can be adjusted to control the amount of advance of the grinding wheel per stroke of piston 73. This governs the amount of stock removed from the wheel in a dressing operation.

Between the sections of the nut 85 there is mounted on the projecting portion of lug 86 a stud or button 96. This stud or button is adapted to engage a spring-pressed plunger 97 to trip a limit-switch 98, when the wheel has been advanced as far as is practical, that is, when the wheel has been worn down to its practical working limit. The limit switch, which is mounted in the carrier 50, is wired electrically into the operating circuit of the machine so that when it is tripped it lights a light. The operator then knows that he must change his grinding wheel.

Figure 1:
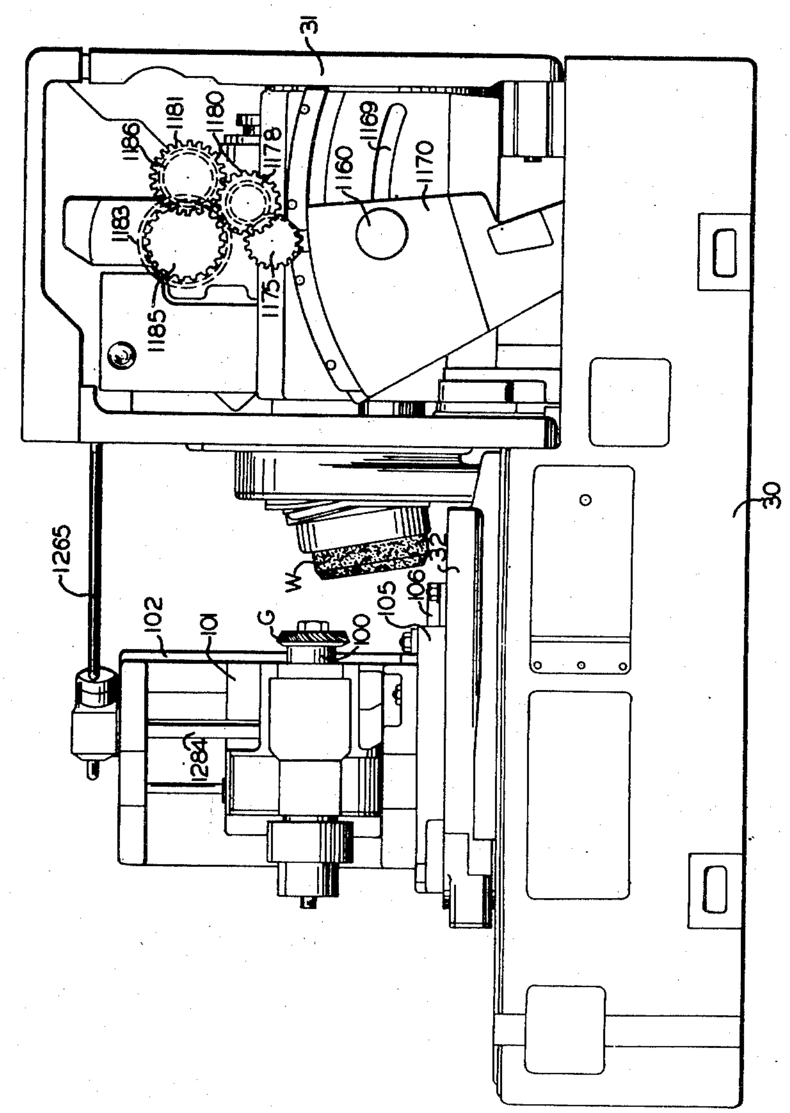
Fig. 1 is a side elevation of a spiral bevel and hypoid gear grinding machine built according to one embodiment of this invention, the cover plate at one side of the machine being removed better to show certain operating parts.

The work G (Figs. 1 and 2), which is to be ground, is adapted to be secured to the work spindle 100 of the machine. This is suitably journaled on anti-friction bearings 1311 and 1312 (Fig. 37) in a head 101 which is mounted for vertical sliding adjustment on plane surfaced ways 1316 and 1317 of a column 102. Vertical adjustment of the work head may be effected by rotation of the knurled knob 1320 which has a graduated dial 1321 secured to it. This knob is secured to or integral with a screw 1322 that threads into a nut 1324 which is secured to the work head 101. The column 102 is mounted for rectilinear adjustment axially of the work spindle on ways 103 and 104 (Figs. 1 and 2) that are formed upon the upper surface of a swinging base 105. The swinging base itself is pivotally mounted for angular adjustment about an axis x on sliding base 106. A guide-way 107 is provided on the sliding base for this purpose. The swinging base can be secured on the sliding base 106 in any adjusted position by means of T-bolts that engage in the arcuate T-slot 108 formed in this guide-way. The sliding base 106 is mounted for rectilinear adjustment and sliding movement upon the sub-base 32 being guided by the ways 110 and 111 formed on the sub-base and sliding on rollers 112 and 113 (Fig. 3) that are mounted in the top and sides of these ways. The sub-base is adjustable angularly on the bed 30 of the machine. For this purpose it has a trunnion 115 secured to it which is journaled in a plate 116 that is secured by screws 117 to the base 30. The sub-base is graduated at its periphery, as shown in Fig. 2, concentric with the axis of trunnion 115 to permit accurate adjustment of the sub-base. The graduations read against the zero mark formed on lug 118 which is integral with the base 30.

The vertical adjustment of the head 101 on the column 102 permits of positioning the axis of the work spindle to intersect or to be offset from the axis of the cradle, as may be desired in the grinding of spiral bevel or hypoid gears. The rectilinear adjustment of the column 102 on the swinging base 105 permits of positioning the work in accordance with the cone distance of the gear to be ground. The angular adjustment of the gear to be ground. The angular adjustment of the swinging base 105 on the sliding base 106 permits of effecting the desired root angle setting of the work. These adjustments are similar to those provided in the machine of application No. 779,890 above mentioned and reference may be had to that application for a more detailed description thereof.

Figures 21, 22, 25:
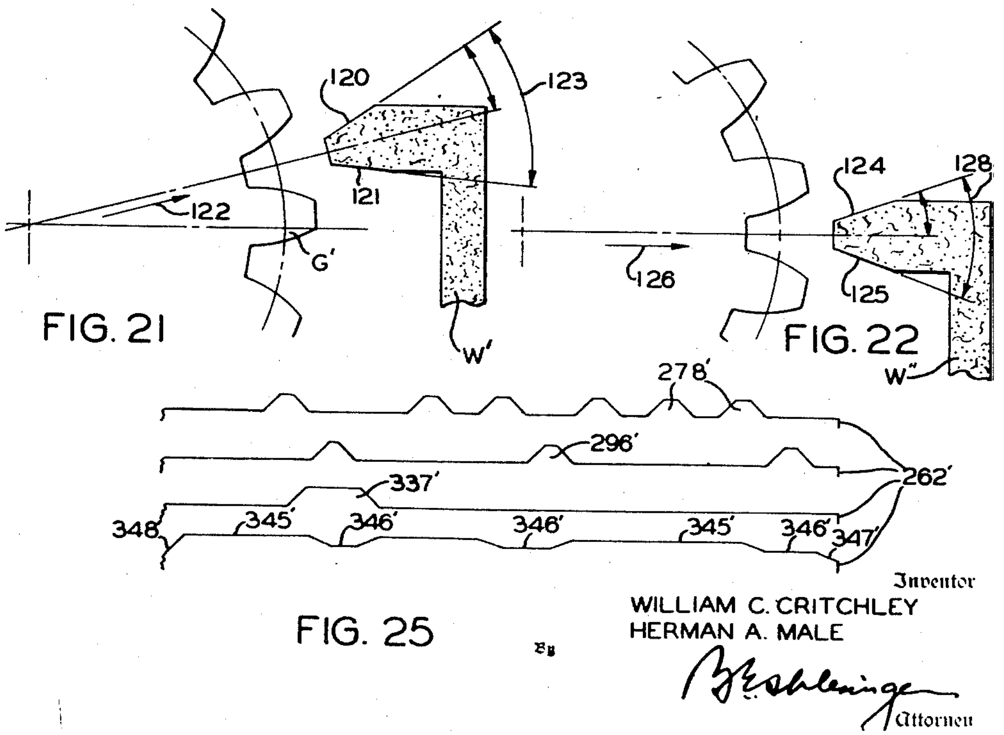
Figs. 21 and 22 are diagrammatic views showing how the angular adjustment of the sliding base of the machine permits feed of the work into the grinding wheel in a direction which bisects the angle between opposite sides of that wheel both where the wheel has different pressure angles on opposite sides and where the wheel has equal pressure angles on opposite sides.
Fig. 25 is a diagrammatic view showing the contours of a modified set of control cams for controlling the operation of the machine when the grinding wheel is dressed with the work in advanced position.

The angular adjustment of the sub-base 32 permits of positioning the sliding base 106 so that the sliding base will travel in a direction to bisect the angle between opposite sides of the grinding wheel. Thus, as shown in Fig. 21, if the grinding wheel W' has opposite side surfaces 120 and 121, that have different pressure angles or inclinations to the axis of the wheel, the sub-base 32 can be adjusted so that the work G' may be fed in a direction, denoted by the arrow 122, which is inclined to the axis of the cradle 35 and which bisects the angle 123 between the sides of the wheel at the point of engagement of the wheel with the work. This insures equal wear on both outside and inside of the wheel and permits equal amounts to be dressed off both sides of the wheel, giving maximum wheel life. For a wheel W'' that has equal pressure angles on opposite sides, that is, whose opposite side surfaces 124 and 125 have equal inclination to the axis of the wheel, the sub-base 32 may be adjusted to zero position. In such case the direction of feed 126 of the sliding base, which is now in the direction of the cradle axis, will also bisect the angle 128 between the sides of the wheel at the point of engagement of the wheel with the work.

During grinding, the work is fed into operative relation with the grinding wheel; then the wheel and work are rolled together to generate a tooth surface or a pair of tooth surfaces on the work; then the work is withdrawn from engagement with the wheel and the work is indexed. The generating motion is effected in conventional manner by swing of the cradle and timed rotation of the work spindle.

Figures 8, 9:
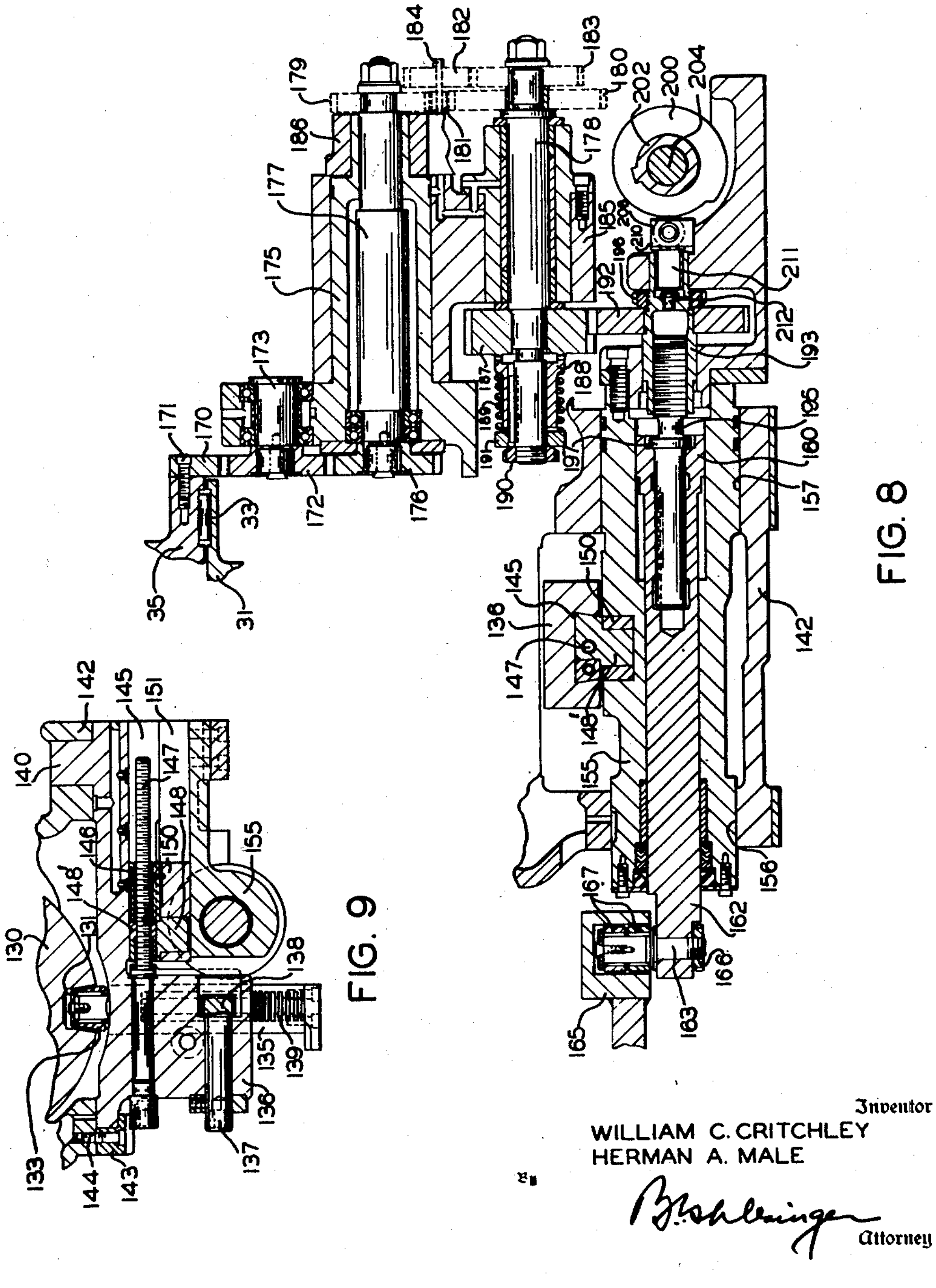
Fig. 8 is a fragmentary sectional view showing details of the mechanism for effecting feed of the work into the wheel.
Fig. 9 is a fragmentary sectional view showing further details of the mechanism for producing the alternate movements of the work to and from operative position.
Figure 26:
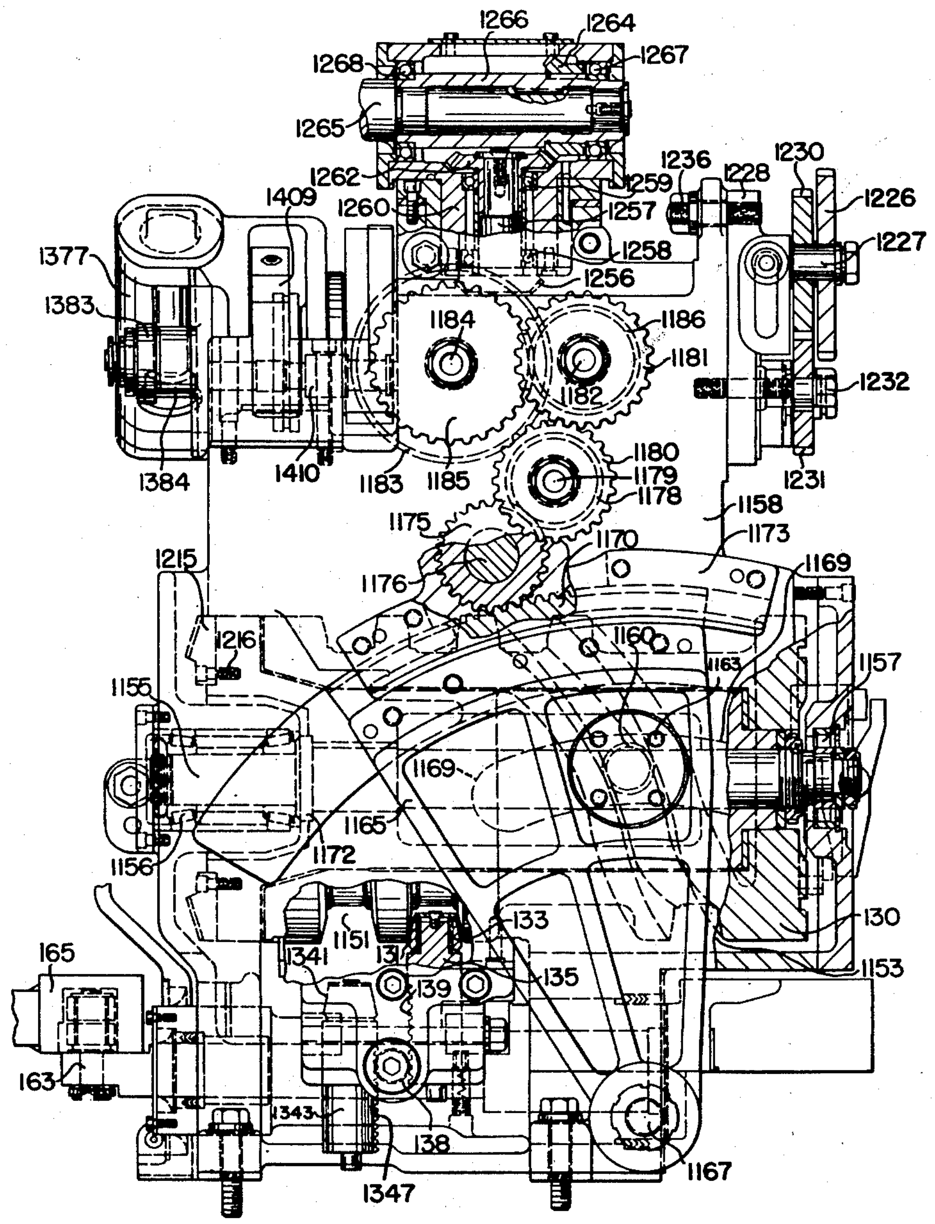
Fig. 26 is a side elevation of one of the brackets on the cradle housing, showing parts of the generating and feed mechanisms, parts being broken away.
Figure 27:
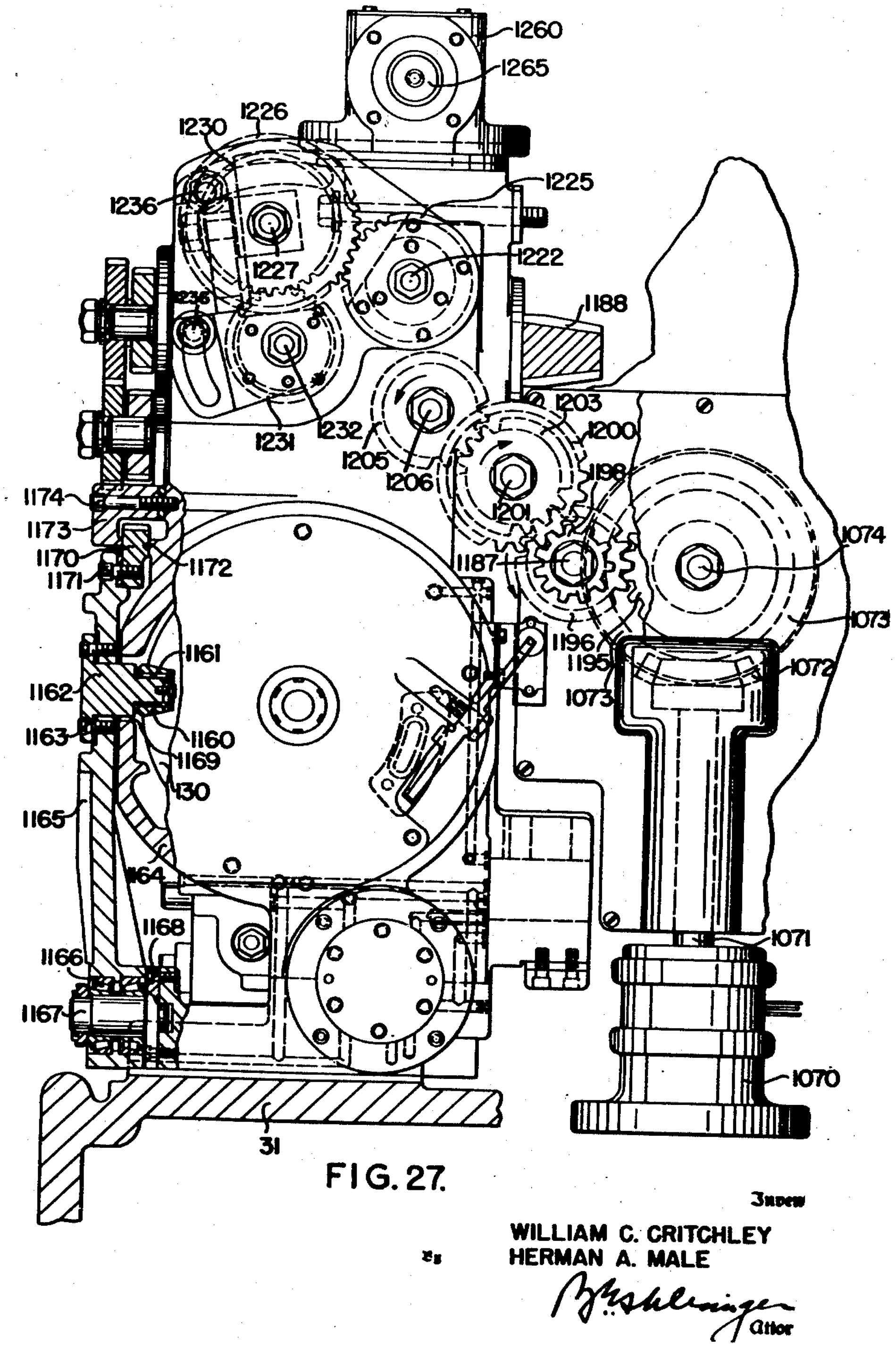
Fig. 27 is a rear view of the same bracket, parts being broken away.

The swinging movement of the cradle is effected by operation of a barrel cam 130 (Figs. 9, 26 and 27). This cam has a plurality of tracks 1151, 131 and 1153. It is keyed to a shaft 1155 that is journaled on anti-friction bearings 1156 and 1157 in a bracket 1158 that is secured in any suitable manner to the cradle housing 31. Either of the tracks 1151 or 131 may be used selectively to control the movement of the work to and from operative engagement with the grinding wheel as will be described later. The track 1153 controls the movement of the cradle.

A tapered cam roller 1160 engages in the track 1153. It is mounted by means of anti-friction bearings 1161 (Fig. 27) on a stud 1162 which is secured by screws 1163 to a rocker arm 1165. The rocker arm is journaled at its lower end by means of anti-friction bearings 1166 on a stud 1167 which is secured by screws 1168 to the bracket 1158. The stud projects through an arcuate slot 1169 (Fig. 26) in the cam housing 1164 (Fig. 27) so that the roller 1160 may engage in the cam track 1153. The slot 1169 is concentric with pivot pin 1167.

There is a spur gear segment 1170 secured by screws 1171 to the outer end of rocker arm 1165. This spur gear segment meshes with a spur gear 1175 which is secured to a shaft 1176 that is journaled in the bracket 1158. The pinion 1175 meshes with a spur gear 1178 that is secured to a shaft 1179. There is a second spur gear 1180 secured to this shaft. This gear may be meshed with a spur gear 1181 that is secured to a shaft 1182, or it may be meshed with a spur gear 1183 that is secured to a shaft 1184. This shaft has a second spur gear 1185 secured to it which meshes with a spur gear 1186 that is secured to shaft 1182. Shaft 1182 is journaled on anti-friction bearings 1187 and 1189 (Fig. 35) in bracket 1158 and has a hypoid pinion 1188 integral with it at its inner end. This hypoid pinion meshes with a hypoid gear 1190 (Fig. 4) which is secured to the cradle 35 and which is coaxial with the cradle 35.

The segmental gear 1170 (Fig. 27) is held against an arcuate guide surface 1172 (Fig. 26) by a gib 1173 which is secured to cam housing 1164 by screws 1174 (Fig. 27) so as to prevent chatter of the rocker arm 1165 in its movement. Guide surface 1172 is curved about the axis of stud 1167.

The cam 130 makes one revolution per tooth of the work; and the cam track 1153 will operate through the gearing described to swing the cradle forward and back once per tooth of the work. Whether the cradle swings upward and then downward in a tooth grinding cycle, or, vice versa, downward and then upward is determined by whether shaft 1182 is driven through gears 1180 and 1181 or through gears 1180, 1183, 1185 and 1186. When shaft 1182 is to be driven through gears 1180 and 181, change gear 1183 may be removed from the machine, and when shaft 1182 is to be driven in the opposite direction, change gear 1181 may be removed.

The barrel cam 130 is adapted to be driven from a motor 1070 (Fig. 27) which is mounted at a suitable point in the cradle housing 31. The armature shaft of this motor is connected to a shaft 1071 which is journaled in the cradle housing 31 and which carries a bevel pinion 1072 that meshes with and drives a bevel gear 1073. This gear is mounted on a shaft 1074 which is journaled in the cradle housing 31. There is a spur gear 1195 secured to this shaft which meshes with a spur gear 1196. Gear 1196 is secured to a shaft 1197 which carries a spur gear 1198 that meshes with a spur gear 1200.

Gear 1200 is secured to a shaft 1201. A spur gear 1203, which is secured to this shaft, meshes with a spur gear 1205 that is keyed to a shaft 1206. There is a bevel miter gear 1210 (Figs. 28 and 29) fastened to shaft 1206 which meshes with a bevel miter gear 1211. The latter gear is secured to a shaft 1212 which is journaled on anti-friction bearings 1209 and 1214 in a bracket 1389 which is secured to cradle housing 31. A hypoid pinion 1213 is integral with shaft 1212 at its lower end. This pinion meshes with a hypoid gear 1215 that is secured to one end of the barrel cam 130 by screws 1216 (Fig. 26). The gearing is so selected that the cam 130 makes one revolution per cycle of the machine, that is, one revolution per tooth side or tooth sides. The grinding wheel may grind during swing of the cradle in one direction only or during swing of the cradle in opposite directions, according to any of the well known generating methods.

Figures 34, 35, 37:
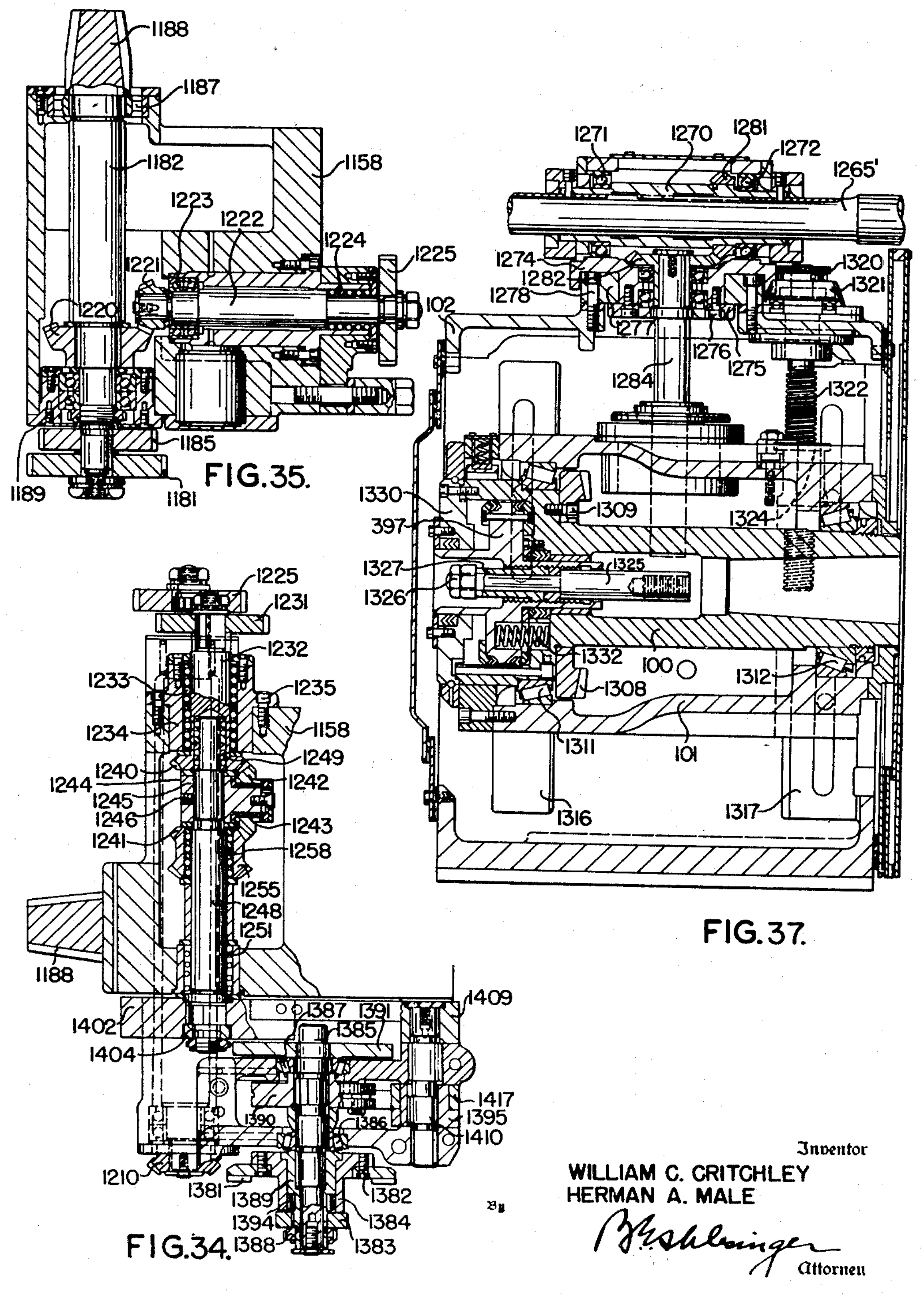
Fig. 34 is a horizontal section taken on the line 34—34 of Fig. 29.
Fig. 35 is a fragmentary section showing details of the drive to the cradle.
Fig. 37 is a longitudinal vertical section through the work head but on a somewhat smaller scale than Fig. 36.

During generation of a tooth side or tooth sides, the work is driven in time with the cradle. The generating drive to the work is derived from shaft 1182 (Fig. 35). This shaft has a bevel gear 1220 keyed to it which meshes with and drives a bevel pinion 1221. This bevel pinion is keyed to a shaft 1222 which is journaled on anti-friction bearings 1223 and 1224 in the bracket 1158. There is a spur gear 1225 keyed to the shaft 1222 at its outer end. This gear meshes with a spur gear 1226 (Fig. 26). This gear is secured to a stub shaft 1227 which is journaled in a quadrant 1228. The quadrant may be of conventional construction and is adapted to swing about the axis of a shaft 1232 (Fig. 27) and to be secured in any adjusted position by bolts 1236. Stub shaft 1227 carries at its inner end a spur gear 1230. Gear 1230 meshes with a spur gear 1231 which is secured to a shaft 1232 (Fig. 34). This shaft is journaled directly on balls 1233 in a sleeve 1234 that is secured by screws 1235 to the bracket 1158.

The shaft 1232 has a bevel gear 1240 at its inner end which forms one of the side gears of a differential that is designated as a whole at 1244. The other side gear of this differential is denoted at 1241. 1242 designates the planetary pinion of the differential. This meshes with the two side gears 1240 and 1241. This pinion is journaled directly through balls 1243 on a spider member 1245 that is secured by a key and by a set-screw 1246 to a shaft 1248. This shaft is journaled on balls 1249 in shaft 1232 and on balls 1250 in side gear 1241 and on balls 1251 in the bracket 1158.

Integral with the side gear 1241 is a bevel gear 1255. This gear meshes with a bevel gear 1256 (Fig. 26) that is integral with a shaft 1257. This shaft is journaled on anti-friction bearings 1258 and 1259 in a swivel member 1260 that is rotatably adjustable in the top of the cradle housing 31. Secured to the upper end of this shaft 1257 is a bevel gear 1262. This bevel gear meshes with a bevel gear 1264 which is keyed to a sleeve 1266 which in turn is keyed to one end of a telescoping shaft 1265. The sleeve 1266 is journaled on anti-friction bearings 1267 and 1268 in the swivel member 1260.

Figure 36:
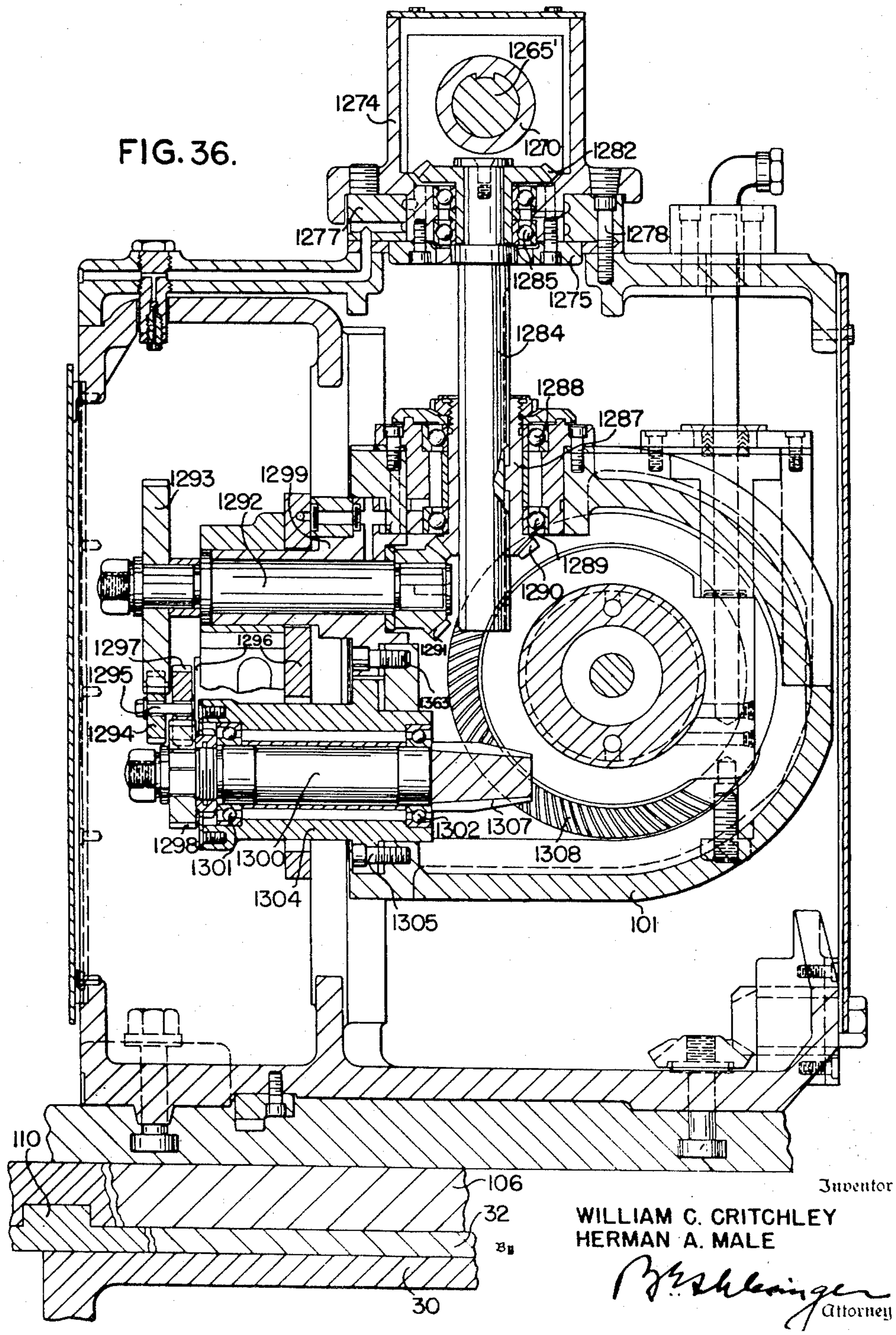
Fig. 36 is a transverse vertical section through the work head of the machine.

The opposite end 1265' (Figs. 36 and 37) of the telescoping shaft is keyed to a sleeve 1270 which is journaled on anti-friction bearings 1271 and 1272 in a swivel member 1274. This swivel member is secured by a gib 1275 and screws 1276 to a ring 1277 which, in turn, is secured by screws 1278 to the top of the work head column 102 of the machine. Fastened to the sleeve 1270 is a bevel gear 1281 which meshes with a bevel gear 1282 that is secured to a vertical shaft 1284. This shaft is journaled at its upper end on anti-friction bearings 1285 in swivel member 1274. At its lower end it has telescoping keyed engagement with a sleeve 1287 that is journaled on anti-friction bearings 1288 and 1289 in the work head 101 of the machine.

Integral with the sleeve 1287 is a bevel gear 1290. This bevel gear meshes with a bevel gear 1291 that is keyed to a horizontal shaft 1292. This shaft is journaled in a sleeve 1299 which is secured by scews 1303 to the work head. There is a spur gear 1293 keyed to the outer end of the shaft 1292. This spur gear meshes with a spur gear 1294 that is secured to a stub shaft 1295 which is mounted in a quadrant 1296. There is another spur gear 1297 secured to this stub shaft which meshes with a spur gear 1298 that has splined connection with a shaft 1300. The shaft 1300 is journaled on anti-friction bearings 1301 and 1302 in a sleeve 1304 that is secured by screws 1305 to the work head 101. There is a hypoid pinion 1307 integral with the shaft 1300 at its inner end. This pinion meshes with a hypoid gear 1308 which is secured by screws 1309 to the work spindle 100 of the machine. The work spindle is journaled on anti-friction bearings 1311 and 1312 in the work head 101.

Through the gearing described the work is driven in time with the cradle to effect the generating motion. The gears 1225, 1226, 1230 and 1231 are change gears and govern the ratio of the generating roll. The gears 1293, 1294, 1297 and 1298 are change gears and govern the number of teeth to be cut in the work. The use of hypoid gears 1188 and 1190 and 1307 and 1308 for driving cradle and work spindle permits of fast speed operation of both the cradle and work gear trains, minimizing the effect of any possible errors in the gears of either of these trains on the work produced, a very important item in these days when gears must be ground to accuracies measured in fractions of ten thousandths of an inch.

The gear G (Fig. 1) which is to be ground, may be secured to the work spindle 100 by any suitable chucking mechanism. This chucking mechanism may be actuated by a draw bar 1325 (Fig. 37) which is secured by nuts 1326 to a sleeve 1327 that is threaded into a piston 397. The piston is adapted to reciprocate in a cylinder which is designated as a whole at 1330. The draw bar 1325 may be moved rearwardly to chucking position and forwardly to dechucking position by fluid pressure, or it may be moved rearwardly to chucking position by coil springs such as denoted at 1332 and forwardly to release position by fluid pressure. This type of chucking mechanism is well known in the art and need not be further described.

During operation of the machine, the work is fed into operative relation with the grinding wheel, and then the grinding wheel and work are rolled together to generate a tooth surface or a pair of tooth surfaces of the work, and then the grinding wheel is withdrawn from engagement with the work and the work is indexed. The mechanism for moving the work toward and from operative position is actuated by rotation of barrel cam 130. The cam is provided with two feed track-ways 1151 and 131 (Fig. 26) already mentioned. The track-way 1151 is ordinarily not used in grinding. It is provided so that the cam of this machine may be interchangeable with the control cam of the machine of the Stewart and Carlsen application above mentioned. Likewise for interchangeability there are two cam rollers 1341 and 133 provided in the present machine for engagement selectively with the cam tracks 1151 and 131. The two rollers are journaled on posts 1343 and 135, respectively, which are mounted for axial reciprocation in a cam lever 136. The posts can be shifted axially in the cam lever to move one cam roller into engagement with one track-way and simultaneously move the other cam roller out of engagement with the other track-way by rotating a stub shaft 137 (Fig. 9) that has a spur pinion 138 (Figs. 9 and 26) integral with it. This pinion meshes with racks 1347 and 1349 cut into confronting sides of the posts 1343 and 135, respectively.

The lever 136 is pivotally mounted by means of a pin or trunnion 140, which is integral with it, in a suitable bracket or housing 142. A gib 143, which is secured to the bracket by screws 144, serves to hold and guide the lever in its pivotal movement. Slidably mounted in an elongated slot 145 in the lever is a block 148. This block is adjusted by means of a screw shaft 147 which threads into a nut 146 that is secured in the block 148.

There is a pivot pin 148' integral with block 148, and on this pin there is pivotally mounted another block 150 which engages in an elongated slot 151 formed in an extension of a cylinder 155. The cylinder is slidably mounted in aligned bearings or guides 156 and 157 (Fig. 8) of the bracket 142. A piston 160 is mounted to reciprocate in the cylinder 155. Integral with this piston is a piston rod 162. This piston rod has a coupling pin 163 secured in it by a nut 166. The coupling pin carries two rollers 167 that engage in a recess in a bar 165. Bar 165 is connected to the sliding base 106 through a universal joint 168 (Fig. 2). Thus motion of the lever 136 may be transmitted to the sliding base.

Fluid under pressure may be admitted to the right hand side of the piston 160 to move the sliding base away from the grinding wheel sufficiently to permit removal of a completed gear and positioning of a new work piece, but during grinding of the gear the piston 160 is held in working position under fluid pressure on the left hand side of piston 160; and alternate movements of the work to and from engagement with the grinding wheel are controlled by the cam 120. and effected through lever 136.

For grinding gears especially by the "Duplex" method, where both sides of a tooth space of both mating tapered gear and pinion are ground simultaneously, it is desirable, as previously stated, to effect a helical motion between the grinding wheel and the work while each tooth space of the work is being ground. To effect this helical motion, the sliding base 106 is moved during grinding in time with the movement of the cradle 35. The mechanism for producing the motion of the sliding base is actuated from the motion of the cradle.

There is a spur gear 170 (Fig. 4) secured to the cradle by screws 171. This spur gear meshes with a spur gear 172 (Fig. 8) which is keyed to a stud 173 that is journaled on anti-friction bearings in a support 175. This support is mounted in a bracket 185 that is mounted on upright 31. The spur gear 172 meshes with another spur gear 176 which is keyed to a shaft 177 that is also journaled in the support 175. The shaft 177 is adapted to drive a shaft 178 either through a spur gear 179 and a mating spur gear 180, or through the spur gears 179, 181, 182 and 183. The spur gear 179 is adapted to be keyed to shaft 177. The spur gears 180 and 183 are adapted to be keyed to shaft 178. The spur gears 181 and 182 are journaled upon a stud 184 which is secured in a quadrant 186 that is adjustable angularly about the axis of the shaft 177. Through the gearing described, shaft 178 can be driven in either direction.

Mounted upon the shaft 178 is a long-faced spur pinion 187. This is adapted to be connected to the shaft by a face clutch member 188 which has a sliding key connection with the shaft. The face clutch may be resiliently held in operative position by a coil spring 189 or may be positively locked in such position by the nut 190 which threads onto shaft 178 and engages washer 191. The pinion 187 meshes with a gear 192 that is keyed to a sleeve 193. This sleeve has threaded engagement with the threaded end of a stud 195 which fits into a bore of the piston 160 and has a sliding keyed connection therewith. The gear 192 is held on sleeve 193 by a nut 196.

Obviously, when the clutch 188 is in engagement, the motion of the cradle 35 will be transmitted either through the gearing 179, 180 or through the gearing 179, 181, 182, 183 to the sleeve 193, causing the piston rod 162 to be moved in one direction or the other to transmit motion to the sliding base 106 through bar 165. The pressure fluid in the cylinder 155 holds the piston 160 against the flange 197 of bar 195 so that the helical motion of the sliding base may take place in either direction. Through proper choice of the change gears 179 and 180 or of change gears 179, 181, 182 and 183, then, any desired ratio of movement of the sliding base to rotation of the cradle may be obtained to effect the desired helical motion.

As previously stated, the work is indexed periodically, namely, after grinding of a tooth side or a pair of tooth sides. The indexing mechanism may be of any suitable character. That shown is of the type disclosed in the Wildhaber U. S. Patent No. 2,477,105, granted July 26, 1949.

Figures 28, 29, 30, 31, 32, 33:
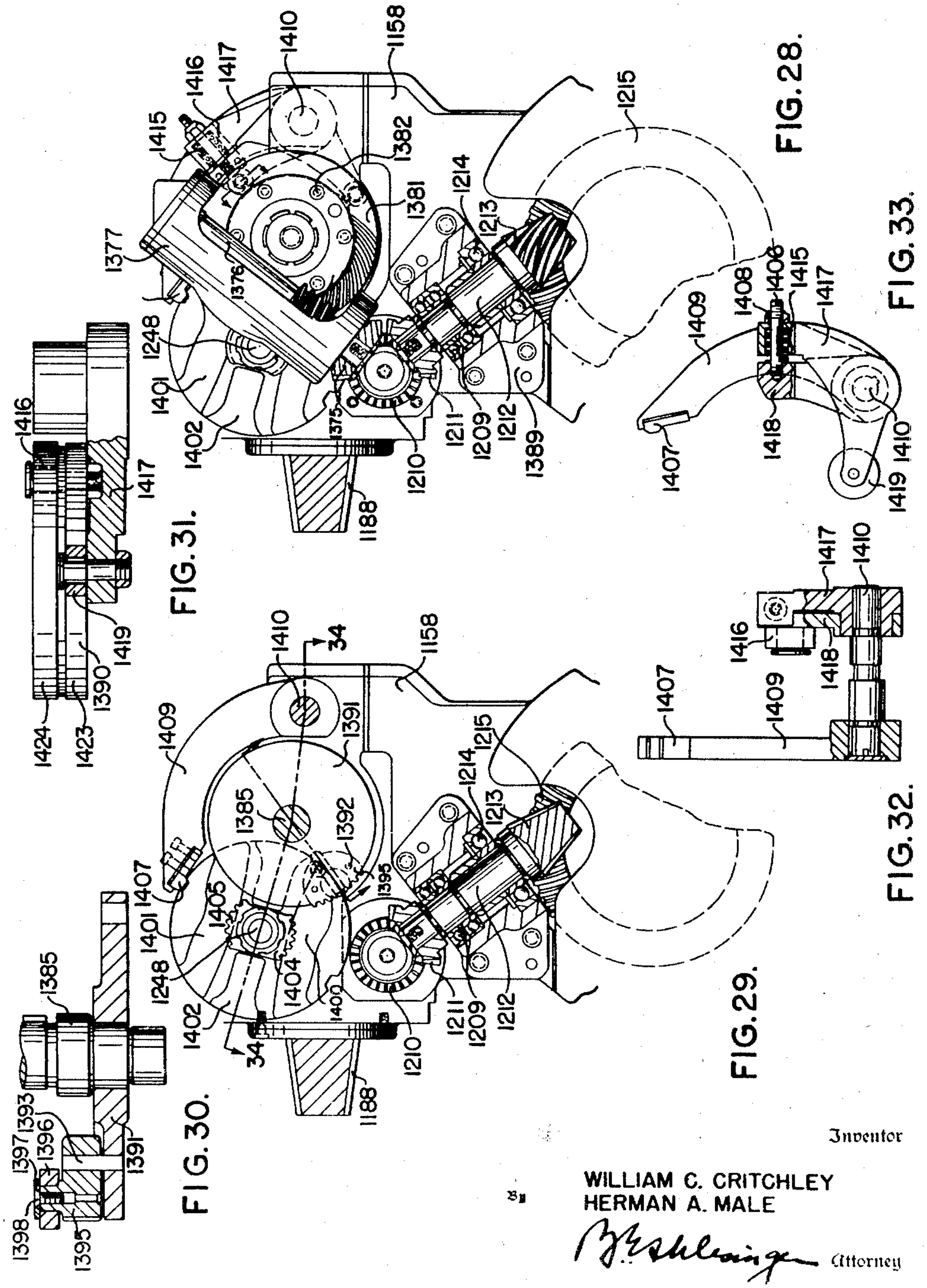
Fig. 28 is a view looking at the front of these brackets, showing details of the drives to the control cam and to the indexing mechanism of the machine.
Fig. 29 is a similar view, but with parts of the drive to the index mechanism removed in order to show more clearly details of the index mechanism itself.
Fig. 30 is a diammetrical section through the drive member of the modified Geneva type index mechanism of the machine.
Fig. 31 is a view showing the trip cam and trip lever of the indexing mechanism.
Figs. 32 and 33 are views at right angles to one another showing in detail the trip and lock-up levers of the index mechanism, parts being broken away in both figures.

The indexing mechanism is actuated from the bevel gear 1210 (Figs. 28 and 29). This gear meshes with and drives not only bevel gear 1211 but also a bevel gear 1375. The gear 1375 is keyed at one end of a shaft 1376. This shaft is suitably journaled in a bracket 1377. Integral with this shaft is a cylindrical pinion 1380 which meshes with a hypoid face gear 1381. This gear is secured by screws 1382 to a sleeve 1384 (Fig. 34). The sleeve has face clutch teeth on its outer end face that are adapted to be engaged by face clutch teeth formed on the opposed face of a ring 1383. The clutch is adapted to be held in engaged position by a nut 388 that threads onto a sleeve 1389. The ring 1383 is keyed to this sleeve. A coil spring 1394, which surrounds sleeve 1389 and seats against ring 1383, tends to release the clutch. Sleeve 1389 is keyed to a shaft 1385. This shaft is journaled on anti-friction bearings 1386 and 1387 in the bracket 1158.

Keyed to the shaft 1385 are a cam member 1390 and an actuating plate 1391. Secured to the actuating plate 1391 by screws 1392 (Fig. 29) and the dowel pin 1393 (Fig. 30) is a spur gear segment 1395. Journaled on this segment is a roller 1396. The roller is held on the segment by a plate 1397 and screw 1398. The roller is adapted to engage successively in cam slots 1400 and 1401 (Fig. 29) formed in a Geneva plate 1402. This Geneva plate is keyed to shaft 1248 (Figs. 29 and 34). Keyed to this shaft, also, and positioned within a recess formed in one face of the Geneva plate is a segmental spur gear 1404 which has teeth 1405 at diametrically opposite sides of its axis registering with the slots 1400 and 1401, respectively.

The Geneva plate 1402 is held against rotation during grinding by a lock dog 1407 (Figs. 28, 29, and 33) which engages in a notch in the plate and which is secured to a lever 1409 that is keyed to a shaft 1410. This shaft is journaled in the bracket 1158.

The cam 1390 (Fig. 31) has two track-ways 1423 and 1424. The lever 1409 is held in locking position by action of a double-armed lever 1417 which is also keyed to shaft 1410. One arm of this lever carries a roller 1419 that rides on one track-way 1423 of the cam. The other arm of this lever has a spring 1415 housed in it which seats against an arm 1418. The arm 1418 is mounted rotatably on the hub of lever 1417 (Fig. 32). It carries a roller 1416 that rides on the track-way 1424 of cam 1390. A pin 1406 (Fig. 33), which threads into arm 1418, and a nut 1408, which threads onto the pin, serve to limit relative movement of arm 1418 and lever 1409.

Each of the cam tracks 1423 and 1424 has a dwell portion of large radius and a dwell portion of small radius, connected by rises, but the major and minor diametral portions of the two cams are slightly spaced angularly relative to one another in accordance with the angular spacing of rollers 1416 and 1419 so that the portion of one track-way which is of major radius is in alignment with the portion of the other track-way which is of minor radius and vice versa. When the locking dog 1409 is in engaging position, roller 1419 is on the high part of cam surface 1423 and roller 1416 is on the low part of cam surface 1424. The shaft 1385 rotates continuously and makes one revolution per cycle of the machine; and the cam 1390 and actuating plate 1391 revolve with it. When the cam 1419 rides down off the high portion of cam surface 1423 and the roller 1416 rides up on the high part of cam surface 1424, the lever 1409 is swung outwardly to disengage dog 1407 from Geneva plate 1402. When this occurs, the actuating plate 1391 is free to rotate under actuation of gearing 1213—1215. The result is that the roller 1396 engages in that one of the slots 1400 or 1401, which is then in registry with the roller, and the actuating plate 1391 drives the Geneva plate 1402. The first part of the motion is under control of the roller 1396. Thus, it starts slowly and accelerates gradually. When the two plates 1391 and 1402 have rotated far enough to bring segmental gear 1395 into engagement with teeth of segmental gear 1404, the motion is continued but at a uniform rate under control of said gearing. When the gears 1395 and 1404 rotate out of engagement, then the roller 1396 again takes control to complete the motion and bring the Geneva plate to a slow stop. As the Geneva plate 1402 rotates, an increment of motion is imparted to the shaft 1248 which operates through the differential 1244 to add or subtract motion from the shaft 1232 which drives the work spindle. Thus, indexing of the work spindle is effected. The Geneva plate makes half a revolution during indexing, and then is locked up again.

In grinding a gear from the solid, as already described, the grinding wheel makes several passes around the gear, being fed a slight distance deeper into the gear prior to each pass. The depth of feed of the wheel into the gear is controlled by a depth feed cam which is given a step-by-step feed motion as will be described more particularly hereinafter. A plurality of depth feed cams may be provided on the machine so that the different rates of feed may be obtained for different jobs depending upon the amount of stock to be removed from the particular gear which is to be ground. In the drawings, the machine is shown as provided with four feed cams 200 (Figs. 15 and 16), although obviously any number may be supplied.

These feed cams are generally similar in shape. Each has a peripheral surface at a progressively increasing radial distance from its axis followed preferably by a dwell portion at a constant distance from its axis and then by a sharp return portion, see Fig. 8. The several cams 200 may differ from one another in the rate of variation in the radial distance of their peripheral surface from the cam axis, and in the location and extent of their dwell portions. Ordinarily four cams are sufficient to cover the range of all work that might be ground upon a particular size of grinding machine.

The cams 200 are keyed to a sleeve 202 (Fig. 16) which in turn is slidably keyed to a shaft 204 that is journaled at 205 and 206 in a bracket 207 that is mounted in the bed of the machine for reciprocation therein as a unit with cylinder 155 to which it is secured, such reciprocation being effected by cam 130. The wide-faced drive pinion 187 permits of the reciprocation while maintaining the drive from the cradle to gear 192 and nut 193.

By shifting the sleeve 202 axially on the shaft 204, the cams may be engaged selectively with a roller 208 (Fig. 8) which is journaled in a head 210. This head has an integral post 211 which is mounted within a hole in the end of sleeve 193 and which is adapted to engage the head of a hardened stud 212 that is secured in the sleeve at the bottom of the hole. As a cam 200 is rotated, then, motion will be imparted to the piston rod 162 and to the sliding base 106. By rotating a cam 200 step-by-step, then, the work can be advanced step-by-step into the wheel. The step-by-step movement of the cams is effected by mechanism hereinafter to be described, after each rough-grinding pass, so that the work may be ground deeper on the ensuing pass. The dwells are provided in the cams for the purpose of permitting the gear to be reground on the finishing operation at the same depth as in the final rough-grinding operation, thereby to clean up the stock and produce smooth tooth surfaces.

Figures 15, 16:
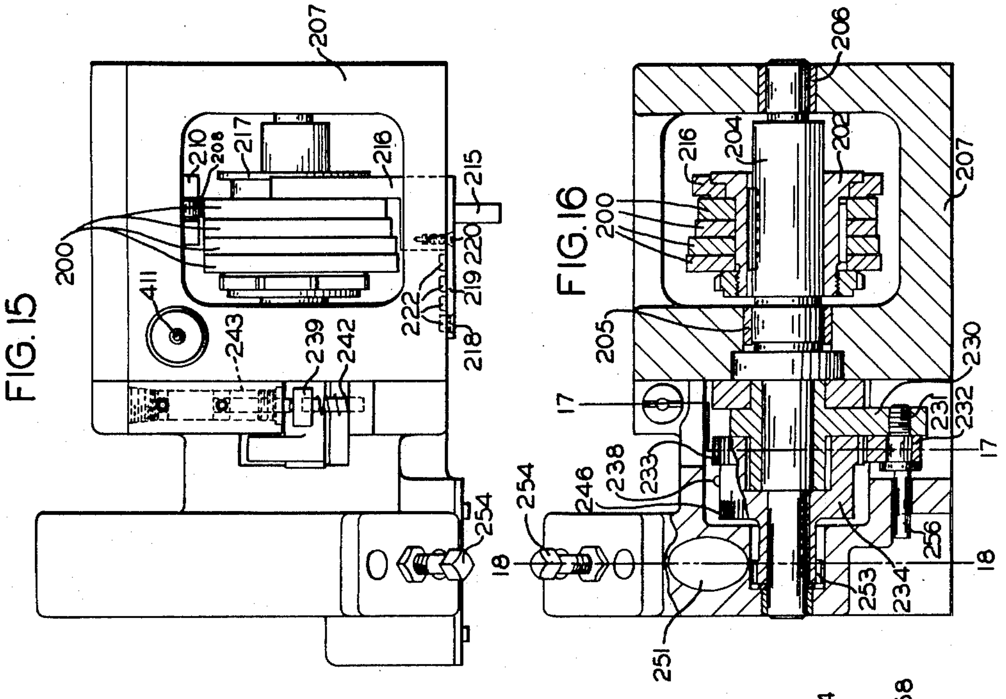
Fig. 15 is a plan view showing the mechanism for controlling the depth of feed of the work into the grinding wheel, and the housing for this mechanism.
Fig. 16 is an axial sectional view through this mechanism taken on the line 16—16 of Fig. 18.

The sleeve 202 may be shifted axially to bring a selected cam 200 into operative engagement with roller 208 manually, on movement of a handle 215 (Fig. 15). This is secured to a yoke member 216 that straddles sleeve 202 and fits between a flange 217 of that sleeve and the cam 200 which is furthermost to the right. The yoke member 216 is adapted to be held in its adjusted position by a spring-pressed pin 218 that is mounted upon a strap 219. Strap 219 is secured by a screw 220 to the yoke member. The pin 218 is adapted to be engaged in any one of a series of four holes 222 in the side of the bracket 207. These holes correspond, respectively, to the positions of each of the four cams 200 when these cams, respectively, are in operative engagement with roller 208.

The shaft 204 is adapted to be rotated step-by-step to cause whatever cam is in operative position to advance the work step-by-step into the grinding wheel.

Figure 17:
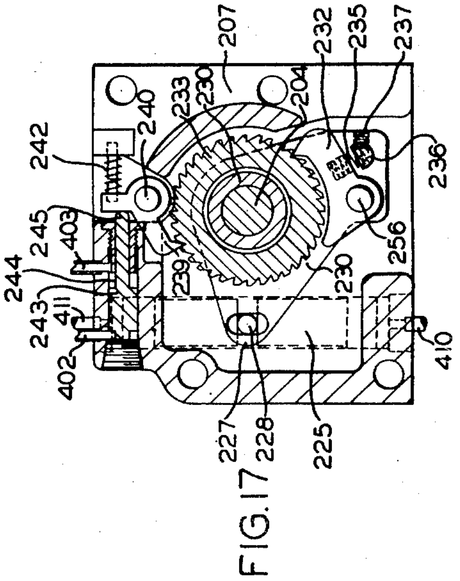
Fig. 17 is a section on the line 17—17 of Fig. 16.

For effecting the step-by-step rotation of shaft 204 a piston 225 (Figs. 17, 18 and 23) is provided that is reciprocable in a cylinder 226 formed in block 207. This piston has a groove 227 around its periphery midway of its length. A pin 228 engages in this groove. This pin is carried by an arm of a rotary member 230 that is mounted rotatably upon the shaft 204. Pivotally mounted by means of a pin 231 on this member 230 is a pawl 232 (Figs. 16 and 17). This pawl is adapted to engage a ratchet wheel 233 which is formed on one end of a sleeve 234 that is keyed to the shaft 204. The pawl is held in engagement with the ratchet wheel by a coil spring 235 which seats at one end in a socket formed in the pawl and at its opposite end in a socket formed in a lug 236 that is secured by a set screw 237 in the arm 230.

On movement of piston 225 in one direction, the pawl 232 is actuated to advance the ratchet wheel a step. On the return movement of the piston 225, the pawl ratchets idly over the ratchet wheel. The ratchet wheel is held against return movement by a dog 239 which is pivoted by means of pin 240 in bracket 207. This dog is urged into engagement with the ratchet wheel by a coil spring 242. It may be disengaged from the ratchet wheel by movement of a piston 243 which reciprocates in a cylinder 244 formed in the block 207. The end of the piston rod 245 engages the tail of the dog at the opposite side thereof from spring 242.

When the dog 239 is disengaged from the ratchet wheel, the ratchet wheel and shaft 204 can be rotated back to starting position by movement of a piston 250 which is adapted to reciprocate in a cylinder 251 also formed in block 207. This piston has rack teeth 252 at one side which mesh with a pinion 253 that is integral with the sleeve 234 and ratchet wheel 233. A stop member 254 that threads into one end wall of cylinder 251 serves to limit return movement of the shaft 204, thereby controlling the initial setting of ratchet wheel 233 which, in turn, controls the number of step-by-step advances of shaft 204 and of whichever depth-feed cam 200 is at the time in operative engagement with roller 208. The sleeve 234 is graduated at 246, as shown in Fig. 16, to permit making this initial setting. The graduations read against a zero mark 259 (Fig. 18) on a lug which is secured to block 207.

On each rocking movement of pawl-carrier 230, that is, on each movement of piston 225 downwardly, a pin 256, which projects from pivot 231 (Figs. 16 and 18) comes into contact with the plunger of a limit switch 258 tripping this limit switch, as will be described further hereinafter. This pin projects through an arcuate slot 259 in block 207.

Figures 10, 11:
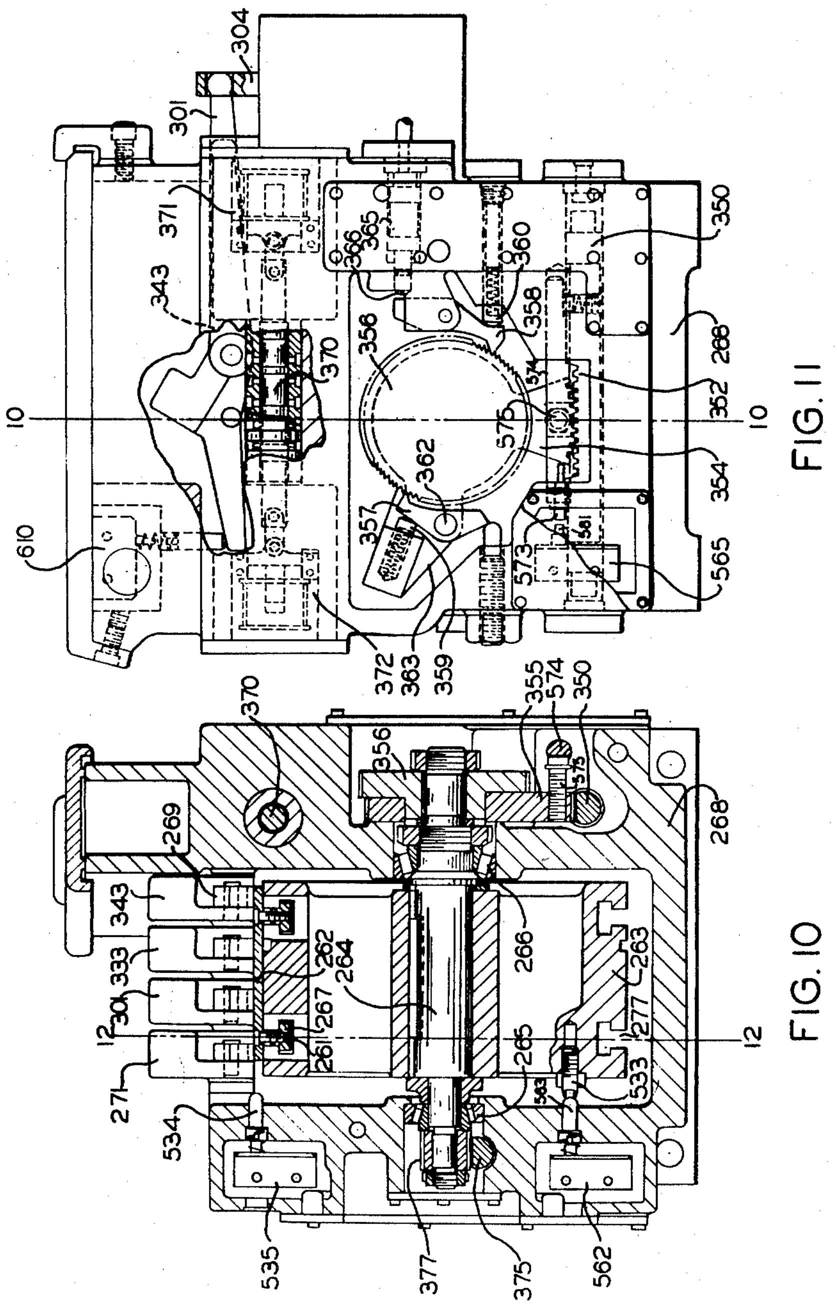
Fig. 10 is an axial sectional view through the drum which controls the automatic cycle of the machine, and showing parts associated therewith, the section being taken on the line 10—10 of Fig. 11.
Fig. 11 is a view at right angles to Fig. 10, parts being broken away.
Figure 12:
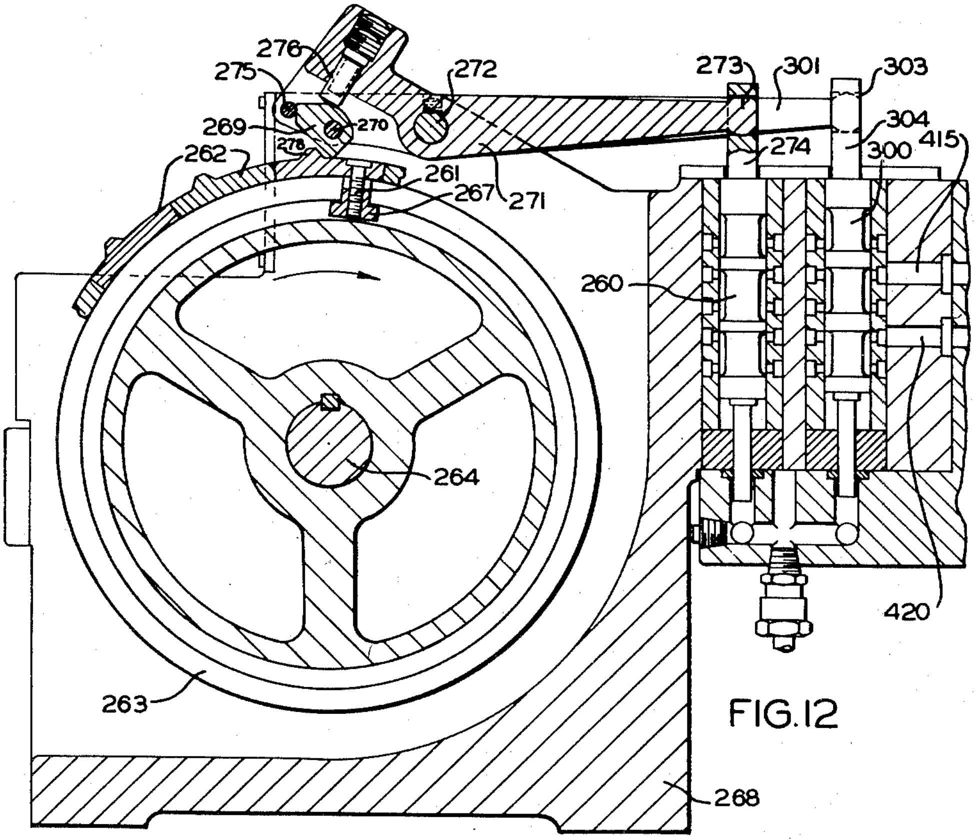
Fig. 12 is a transverse sectional view of the drum and associated parts, the section being taken on the line 12—12 of Fig. 10.
Figure 23:
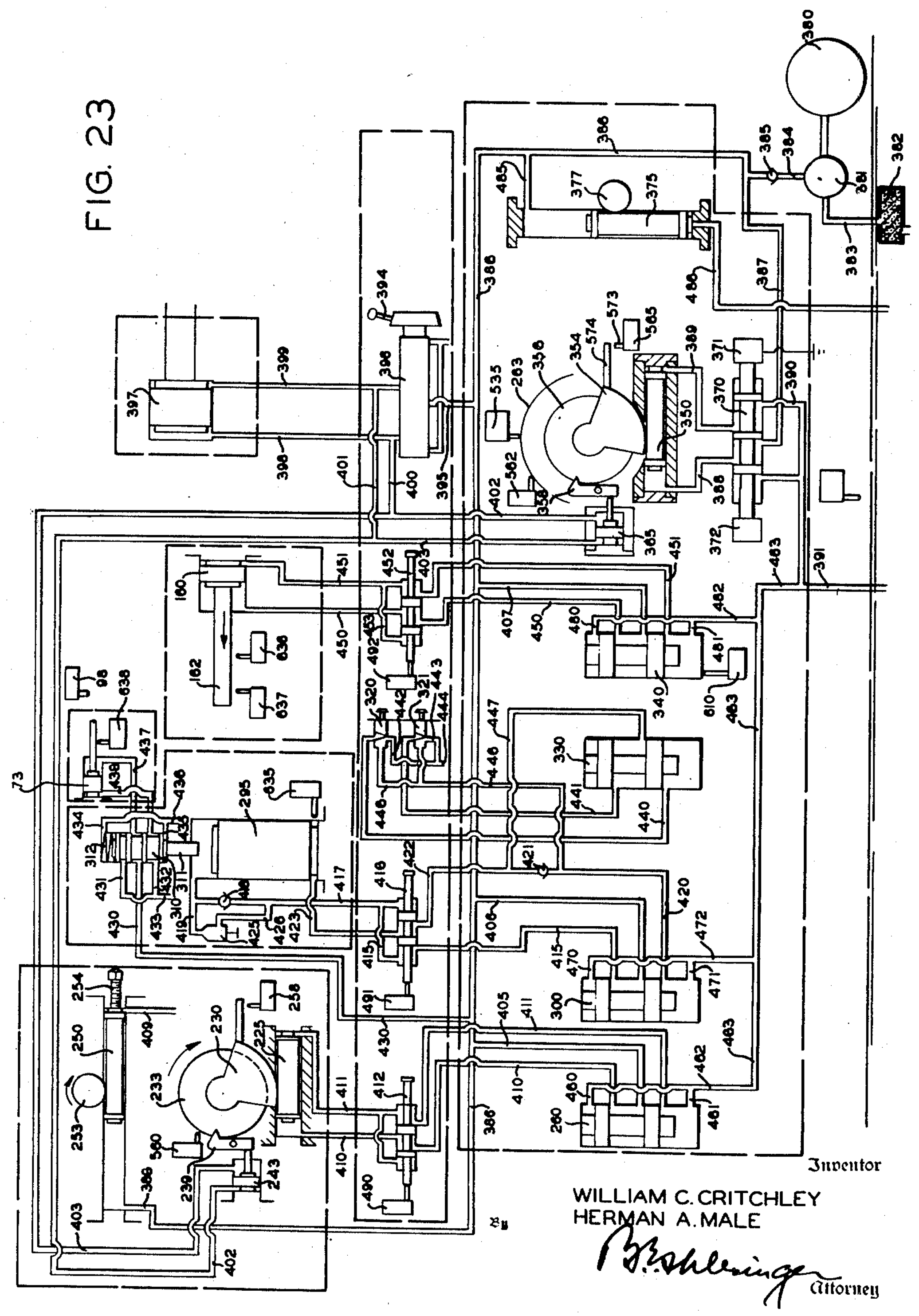
Fig. 23 is a diagrammatic view of the hydraulic circuit of the machine.

The movements of the piston 225 are controlled by a valve 260 (Figs. 12 and 23). This valve is adapted to be shifted by cam lobes 278 formed on a plurality of arcuate plates 262 that are secured to a rotary drum 263 (Fig. 10) by bolts 261 and T-heads 267. The latter engage in peripheral T-slots 277 formed on the drum. The drum 263 is keyed to a shaft 264 which is journaled on anti-friction bearings 265 and 266 in a housing 268.

The lobes or protrusions 278 (Figs. 13 and 14) are adapted to engage a dog 269 (Fig. 12) which is pivotally connected by pin 270 to lever arm 271. This lever arm is pivotally mounted by pin 272 in the block 268 and has one end extending into an aperture 273 in the projecting rod-portion 274 of valve 260. The dog 269 has a tail portion which abuts against a pin 275 that is secured in the lever 271. Another pin 276 is threadably adjusted in the lever 271 to engage the dog so that the dog is held fixed between the two pins 275 and 276 as though it were an integral part of the lever 271.

When the dog 269 is riding on any of the low portions of the cam plate 262 the valve 260 is at one end of its movement. When the dog 269 rides up on one of the lobes or protrusions 278 in a cam plate, the valve is shifted to its other position.

The cam plates 262 control not only the movements of the piston, that operates the step-by-step work feed mechanism, but also the dressing operations of the machine and the movements of the sliding base to and from loading position.

The dressing mechanism of the machine may be of any suitable type and itself forms no part of the present invention. It is shown more or less diagrammatically at 280 in Figs. 3 and 4. The dresser here shown is a single arm dresser 281 that carries a diamond which is adapted to travel in the dressing operation around the full profile of the wheel, first across one side thereof, then over the tip, and then across the other side thereof. This dressing mechanism is mounted on a ring member 282 that is held by a gib 283 and screws 287 on a second ring member 284. The latter member is secured by screws 285 to a third ring member 286 that in turn is secured by screws 288 to the carrier 60. The guard 292 for the grinding wheel is secured to member 282 by screws 293.

A turn-buckle 289, that is pivotally connected at one end to the dressed mechanism 280 by pin 290 and that is pivotally connected at its opposite end by pin 291 to the upright or cradle housing 31, serves to hold the dressing mechanism against rocking with the cradle as the cradle oscillates.

The dressing mechanism, regardless of its type, is operated by reciprocation of a piston 295 (Fig. 23) whose movements are controlled by a valve 300 that is like valve 260. This valve is adapted to be operated by a lever 301 (Fig. 12) which is similar to lever 271 but which is of greater length so as to engage in an aperture 303 in the stem 304 of valve 300. The valves 260 and 300 are placed one above the other for compactness and that is the reason why the two different lengths of levers 271 and 301 are employed.

Figure 13:
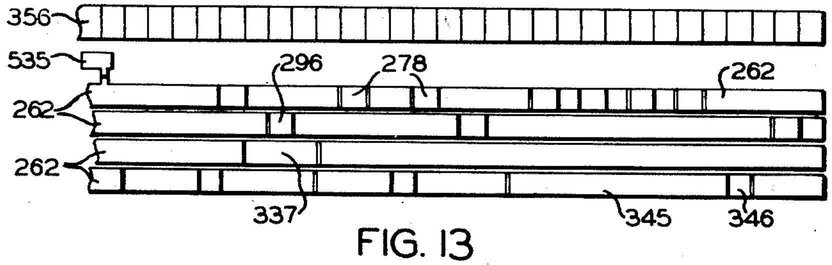
Fig. 13 is a developed plan view showing the cams carried by the control drum and showing the ratchet wheel associated therewith.
Figure 14:
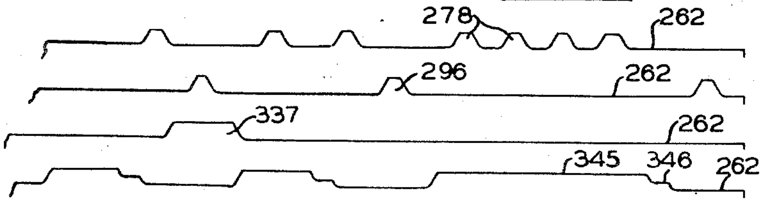
Fig. 14 is a diagrammatic view showing the contours of these several control cams which are employed when the grinding wheel is dressed in loading or fully-withdrawn position.

Lever 301 is tripped from protrusions 296 Figs. 13 and 14) on cam plate 262 as these protrusions are brought into engagement with the dog 269 of lever 301. When the dog rides up on a protrusion 296 in the step-by-step movement of drum 263, the valve 300 is shifted in one direction. When the dog rides down off the protrusion, the valve is shifted in the opposite direction. Thus the movements of piston 295 and of dresser 281 are reversed.

Figures 5, 6, 7:
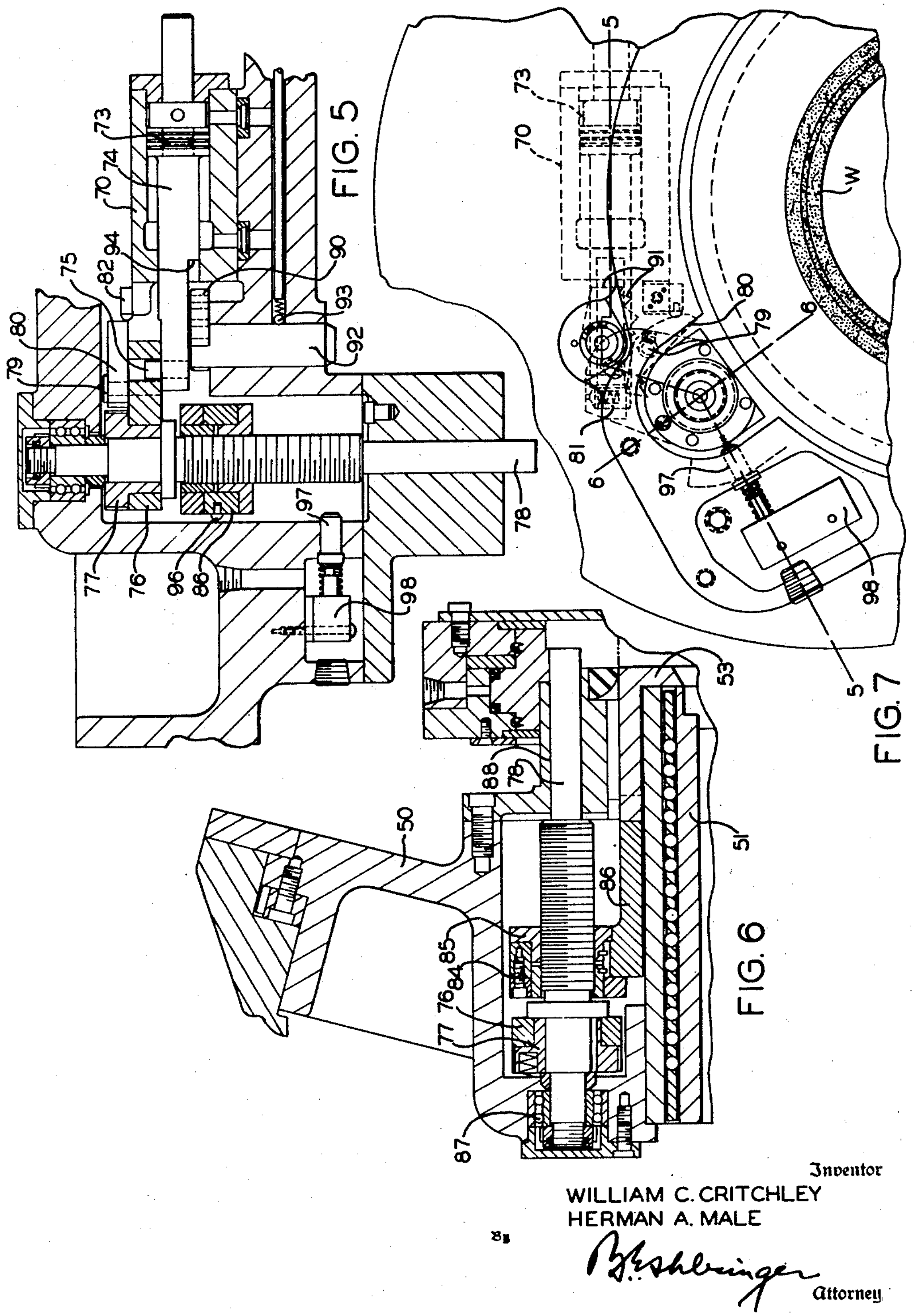
Fig. 5 is a sectional view on a greatly enlarged scale on the line 5—5 of Fig. 7, showing the means for effecting axial advance of the grinding wheel to compensate for wear of the wheel.
Fig. 6 is a fragmentary sectional view on the line 6—6 of Fig. 7 further illustrating the wheel advancing mechanism.
Fig. 7 is a fragmentary front elevation of the cradle also on an enlarged scale as compared with Fig. 3 and further illustrating the wheel-advancing mechanism and associated parts.

In its movement upwardly, the piston 295 engages the projecting stem 311 of the valve 310 (Fig. 23) to shift this valve against the resistance of a spring 312. The valve 310 controls movement of the piston 73 (Figs. 23, 5 and 6)

that actuates the mechanism for advancing the grinding wheel step-by-step to compensate for wheel wear.

In the dressing of a grinding wheel in grinding a gear from the solid, it is customary to effect a final finish-dressing operation prior to finish-grinding so as to obtain as smooth a surface as possible upon the work. The finish-dress is obtained by effecting slow speed movement of the dressing diamond across the wheel prior to a finish-grinding operation. The rate of movement of the diamond in dressing is controlled by one of two throttle valves 320 and 321 (Fig. 23) which may be of conventional construction. These valves are adjusted to effect different rates of movement of the dressing diamond, one of the valves allowing relatively fast movement for rough-dressing operations and the other valve permitting slow movement only for a finish-dressing operation.

The valve 330 selects which of the throttle valves 320 or 321 is to control for a given dressing operation. This valve is adapted to be shifted on rotation of drum 263 (Fig. 12) by a protuberance 337 on one of the cam plates 262 (Figs. 10, 13 and 14). The protrusion 337 operates the lever 333 (Fig. 10) which is similar to lever 271 and which is connected to valve 330.

The movements of piston 160 (Fig. 8) that move the sliding base 106 from loading to working position and vice-versa are controlled by a valve 340 (Fig. 23). This valve is similar to valves 260 and 300 and is operated by a lever 343 (Fig. 10) similar to lever 301. The lever 343 is actuated by protrusions 345 on cam plates 262 (Figs. 13 and 14).

The drum 263 is adapted to be rotated step-by-step by a piston 350 (Figs. 10, 11 and 23) which has a rack 352 secured to it. This rack meshes with a segment 354 which is integral with a rotatable plate 355 that is journaled upon the hub of a ratchet wheel 356. The ratchet wheel is keyed to the shaft 264. The ratchet wheel is adapted to be advanced by a pawl 357 which is pivotally mounted by means of pin 362 on an arm 363 of plate 355. This pawl is resiliently held in engagement with the ratchet-wheel by a spring-pressed plunger 359 which is mounted in the arm 363. A dog 358, which is pivotally mounted on block 268 by means of pin 364 serves to hold the ratchet wheel 356 in any position to which it may be advanced. This dog is resiliently held in engagement with the wheel by a spring-pressed plunger 360.

For resetting the ratchet wheel 356 at the end of a grinding operation, the dog 358 is first disengaged from the ratchet wheel. This is done by movement of a piston 365 (Figs. 11 and 23) whose projecting rod portion 366 engages the tail of dog 358. Then piston 375 (Figs. 10 and 23) is actuated to rotate shaft 264. Piston 375 has rack teeth cut into it which mesh with a spur pinion 377 that is keyed to shaft 264.

The movements of the piston 350 are controlled by a valve 370 (Figs. 11 and 23). This valve is connected at its opposite ends to the core pieces or armatures of the solenoids 371 and 372, respectively. When the solenoid 372 is energized, the valve 370 is shifted to the left. When the solenoid 371 is energized, the valve is shifted to the right. The two solenoids are energized alternately as will be described more fully hereinafter.

One way in which the various hydraulically-actuated parts of the machine may be connected is illustrated diagrammatically in Fig. 23. 380 denotes the motor which drives the pump 381. The pressure fluid is drawn from the sump of the machine through a filter 382 and duct 383. It is forced through line 384 against a ball-check valve 385, into lines 386 and 387. From line 387, in the position of valve 370 shown in Fig. 23, it passes into line 388 and thence to the left hand side of piston 350. The opposite side of this piston is on exhaust through lines 389, 390 and 391, the last-named duct returning to the sump.

The line 386 is connected by a line 395 with a rotary valve 396 which is manually operable by handle 394 (Figs. 3 and 23). This valve may be of standard construction and controls in conventional manner the operation of the chucking mechanism of the machine and also the disengagement of the dogs 239 and 358 (Figs. 17 and 11) from ratchet wheels 233 and 356, respectively.

The chucking mechanism, which forms no part of the present invention may be actuated in conventional manner by the piston 397. The piston 397 is connected with valve 396 by lines 398 and 399. These lines are connected with the piston 365, that disengages the dog 358 from ratchet wheel 356, by lines 400, 401, 402 and 403. The lines 402 and 403 connect also with opposite sides of piston 243 that disengages dog 239.

Figure 18:
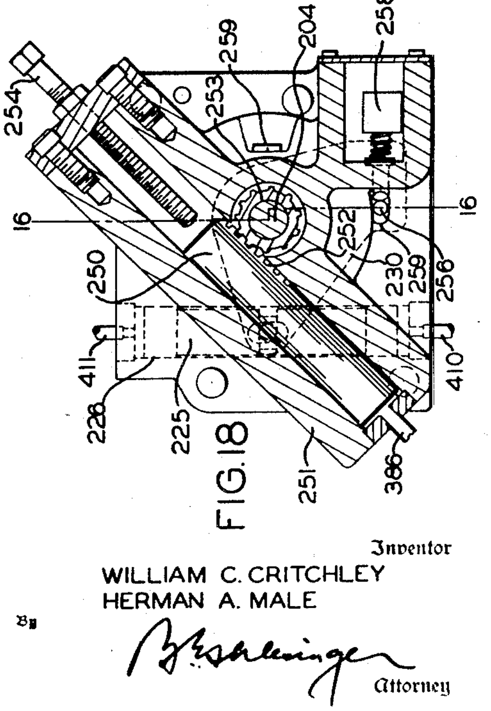
Fig. 18 is a section on the line 18—18 of Fig. 16.

Pressure line 386 is connected by lines 405, 406 and 407 with valves 260, 300 and 340, respectively (Figs. 12 and 23). The pressure line 386 is also connected with one side of the reset piston 250 (Figs. 23 and 18). A leak return 409 leads from the opposite side of this piston back to the sump of the machine.

The valve 260 is connected by lines 410 and 411 with opposite sides of piston 225 (Figs. 17, 18 and 23). This connection may be through a manually shiftable valve 412 which is used in manual operation of the machine as for setting it up.

The valve 300 is connected with the upper side of piston 295 through line 415, manually operable valve 416, line 417, ball check valve 418, and line 419, when the valve 300 is in the position shown in Fig. 23. When the line 417 is on exhaust, the ball check valve 418 is closed and the upper end of the cylinder, in which the piston 295 reciprocates, then exhausts through a throttle valve 425 and line 426 to line 417, and thence through valve 416, duct 415, valve 300, and ducts 470, 472, 463 and 391 to the sump. In the positions shown in Fig. 23, the lower side of piston 295 is on exhaust through lines 423, 422 and 447, a valve 330, line 441, a throttle valve 321, and lines 443 and 444 to the sump. Throttle valves 425 and 321 may be of any suitable or conventional structure. When valve 300 is shifted, the pressure fluid is supplied to the underside of piston 295 through ducts 420, 422 and 423.

The pressure fluid is supplied to the valve 310 from the line 386 through the line 430. Ducts 431 and 432 connect this valve with the line 433 which leads back to the sump. Leak returns 434 and 435 for the valve connect with a line 436 which also leads back to the sump. The valve is connected with opposite sides of the piston 73 by lines 437 and 438, respectively. These lines may reach block 70 (Fig. 4) through ducts drilled in sleeve 66 and commutator 64.

The valve 330, which is a selector valve, is connected with the throttle valves 320 and 321, that control the rate of dressing, by ducts 440 and 441, respectively. These throttle valves, which, as stated, may be of any conventional construction, are connected by lines 442 and 443, respectively, with an exhaust line 444 that leads back to the sump. The valve 320 is connected with line 420 at one side of the ball check valve 421 by a duct 446. The line 422, at the opposite side of the ball check valve 421, is connected with valve 330 by a duct 447.

The valve 340, which controls the movement of sliding base piston 160 (Figs. 8 and 23), is connected with opposite sides of that piston by ducts 450 and 451, respectively, through a manually operable valve 452. Duct 451 is connected with a duct 453 that also communicates with the chamber of valve 452 as shown in Fig. 23.

Ducts 460 and 461 connect valve 260 with the sump through ducts 462, 463, and 391. Ducts 470 and 471 connect valve 300 with the sump through ducts 472, 463, and 391. Ducts 480 and 481 connect valves 340 with the sump through ducts 482, 463 and 391.

The motive fluid is supplied to one side of the piston 375 (Figs. 10 and 23), which serves to reset the cycle control drum 263, from pressure line 386 through a duct 485. The other side of this piston is connected with the sump through a leak return 486.

The several manually-operable valves 412, 416, 452 and 396 are provided to permit manual control of the operations of the machine as for setting the machine up. To prevent automatic operation of the machine while any of these valves is being used, limit switches 490, 491 and 492 are provided. These are normally closed switches and are adapted to be opened by the valve stems when the valves 412, 416, or 452, respectively, are moved to the left in Fig. 23.

Figure 24:
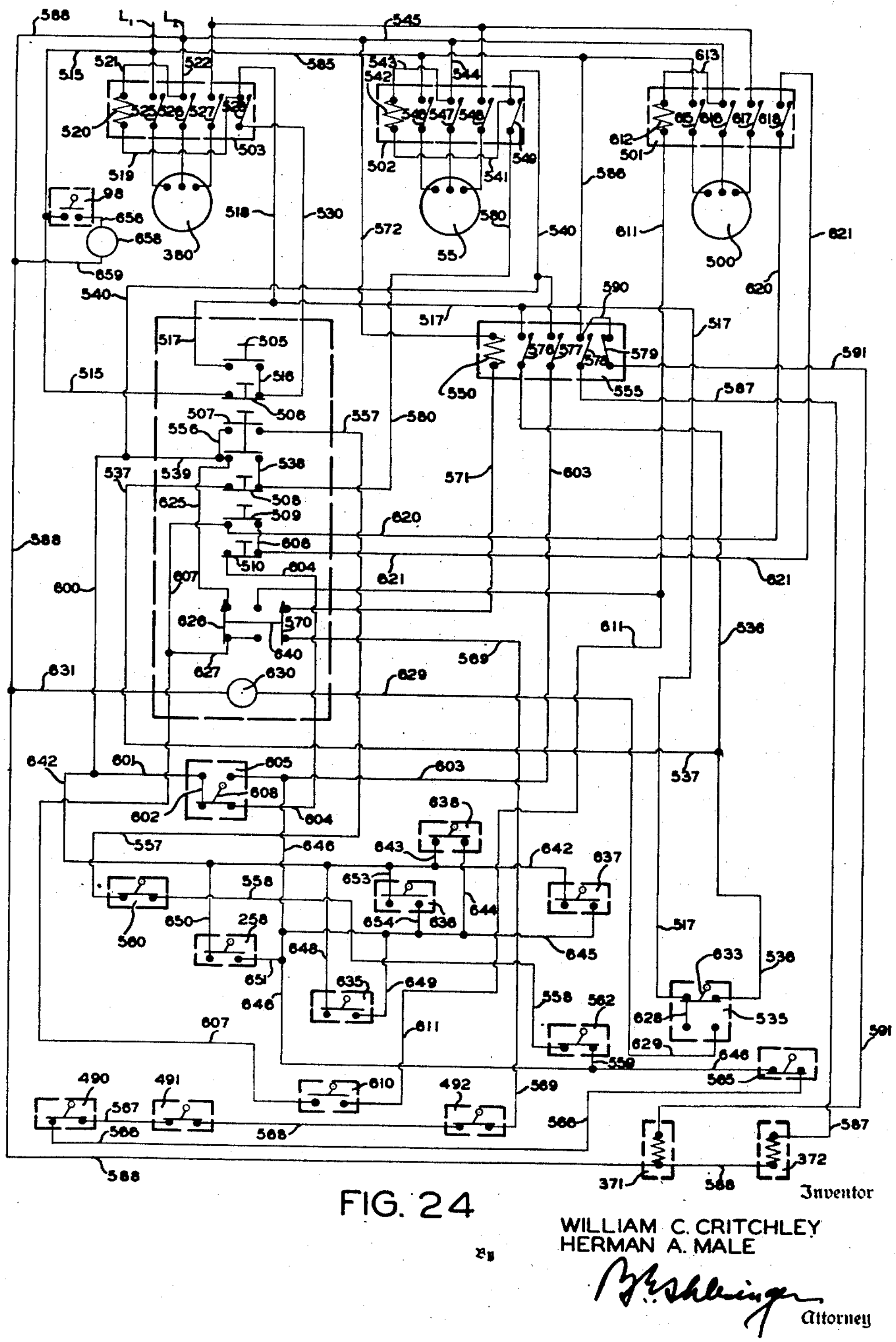
Fig. 24 is a diagrammatic view showing one way in which the various electrical parts of the machine may be wired to obtain the desired cycle of operation.

One way in which the machine may be wired electrically to accomplish its purpose is illustrated diagrammatically in Fig. 24.

The main drive motor of the machine is denoted at 500. This motor, the wheel drive motor 55, and the pump drive motor 380 are controlled by magnetic starters 501, 502, and 503, respectively, which may be of conventional or any suitable construction.

A start button 505 and a stop button 506 are provided to control manual starting and stopping of the hydraulic motor 380. A start button 507 and a stop button 508 are provided to control manual starting and stopping of the wheel motor 55. A start button 509 and a stop button 510 are provided to control the manual starting and stopping of the main motor 500.

To start the hydraulic motor 380, the start button 505 is pressed in. A circuit is then made from the main line $L_1$ through the line 515, the normally-closed stop button 506, the line 516, the now-closed start button 505, the lines 517, 518, and 519, the coil 520 of magnetic starter 503, and the lines 521 and 522 to the main line $L_2$. This energizes the coil 520 and pulls in the switch arms 525, 526, 527 and 528 of the magnetic starter 503. The coil 520 will then be held energized, as long as stop button 506 is closed, from main line $L_1$ through line 515, stop button 506, line 530, switch arm 528, line 519, coil 520, and line 522, to main line $L_2$.

With the hydraulic motor started, the wheel motor 55 may be started by pushing in the wheel start button 507. This circuit is from a main line $L_1$ through the line 515, the stop button 506, line 530, the now-closed switch arm 528 of magnetic starter 503, the line 518, the line 517, the limit switch 535, the lines 536 and 537, the wheel stop button 508, the lines 538, the wheel start button 507, which is a double pole button, the line 539, the line 540, the line 541, the coil 542 of magnetic starter 502, the lines 543, 544 and 545 to main line $L_2$. This energizes the coil 542 of magnetic starter 502 and closes the switch arms 546, 547, 548, and 549 of this starter, thus starting the wheel motor 55. Limit switch 535 (Figs. 24 and 10), which is a double-contact switch, is in the position shown in Fig. 24 when the machine is stopped.

When the wheel start button is pushed in, the coil 550 of relay 555 is also energized. The circuit to this coil is from main line $L_1$ through line 515, stop button 506, line 530, now-closed switch arm 528, lines 518 and 517, limit switch 535, lines 536 and 537, stop button 508, line 538, one pole of wheel start button 507, lines 539 and 556, the other pole of start button 507, line 557, normally-closed limit switch 560, line 558, normally-open limit switch 562, line 559, normally-closed limit switch 565, line 566, normally-closed limit switch 490, line 567, normally-closed limit switch 491, line 568, normally-closed limit switch 492, line 569, switch arm 570 of a double-pole manually-operable switch that is shiftable to permit manual or automatic operation of the machine, as may be desired, line 571, coil 550, lines 572 and 545 to main line $L_2$. This closes the arms 576, 577 and 578 of relay 555 and opens the arms 579 of that relay.

Limit switch 560 is associated with sleeve 234 (Fig. 16) on which the ratchet wheel 233 is formed. A button 238 provided on this sleeve is adapted to be indexed into position to open this switch by the ratcheting of the ratchet wheel on the final depthwise movement of the work.

Limit switch 562 (Figs. 24 and 10) is adapted to be tripped by member 533, which is carried by drum 263, engaging the plunger 563 of that switch when the drum 263 has been reset by piston 375 (Figs. 10 and 23) to its starting position.

Limit switch 565 is adapted to be tripped by a pin 573 (Fig. 11) which is carried by the bar 574 (Figs. 10 and 11) that is reciprocably mounted in block 268. A pin 575, that is threaded into rotary pawl-carrying member 355 and that engages in a kerf in bar 574, serves to actuate the bar and to trip limit switch 565 on each reciprocation of piston 350 (Figs. 10, 11 and 23) thereby alternately making and breaking the circuit through this limit switch. The pin 573 engages the plunger 581 (Fig. 11) of the limit switch.

Limit switches 490, 491 and 492 (Figs. 23 and 24) are those which as already stated cooperate with the manually operable valves 412, 416 and 452. They are open only when these valves are shifted to permit manual operation of the various fluid-pressure operated parts of the machine. When open they prevent automatic operation of the machine.

When the machine is being operated automatically, the main drive motor 500 is started automatically at the proper time in the operation of the machine as will be described more particularly hereinafter.

The coil 542 of magnetic starter 502 is kept energized, after starting of the wheel motor and release of the wheel start button 507, by a circuit from main line $L_1$ through line 515, normally-closed stop button 506, line 530, now-closed switch arm 528, lines 518 and 517, switch 535, lines 536 and 537, normally-closed stop button 508, line 580, now-closed switch arm 549, line 541, coil 542, and lines 543, 544, and 545 to main line $L_2$.

To start the main motor 500 manually, the pump and wheel drive motors 380 and 55 must first be started as above described. Then the operator presses in the feed start button 509. This makes a circuit from the main line $L_1$ through the line 515, normally-closed stop button 506, line 530, now-closed switch arm 528, line 518, line 517, switch 535, line 536, line 537, normally-closed stop button 508, line 580, now-closed switch arm 549 of magnetic starter 502, line 540, line 600, line 601, line 602, the switch arm of the double-contact switch of the automatic stop 605 of the machine, line 604, normally-closed feed stop button 510, line 606, now-closed feed start button 509, line 607, now-closed limit switch 610, line 611, coil 612 of magnetic starter 501, and lines 613 and 545 to main line $L_2$. This energizes coil 612 and closes switch arms 615, 616, 617, and 618 of magnetic starter 501.

The automatic stop 605 may be of conventional construction and has not been illustrated in detail here for that reason. It is of the type that may be adjusted for a predetermined number of indexes. After a complete grinding pass around the work, then, that is, after a grinding operation in all of the tooth spaces of the gear, this stop will be tripped automatically, momentarily breaking the connection between lines 602 and 604 and making a connection between lines 601 and 603. This latter connection is only a momentary connection for the automatic stop mechanism used will be of known type that will automatically close the connection 602—604 again immediately.

Limit switch 610 is mounted in the machine at a point to be tripped from valve 340 (Fig. 23) which controls the movement of piston 160 (Figs. 23 and 8) that moves the sliding base 106 between loading and working positions.

The circuit to the main motor 500 is maintained, after release of the start button 509, from main line $L_2$ through lines 545 and 613, coil 612, line 611, limit switch 610, line 607, line 620, now-closed switch arm 618, line 621, normally-closed feed stop button 510, line 604, automatic stop 605, line 602, line 601, line 600, line 540, now-closed limit switch 549 of magnetic starter 502, line 580, normally-closed wheel stop button 508, line 537, line 536, limit switch 535, line 517, line 518, now-closed switch arm 528 of magnetic starter 503, line 530, normally-closed stop button 506, and line 515 to main line $L_1$.

Besides the limit switches already mentioned the machine is provided with a limit switch 635 which is adapted to be tripped and closed by the piston 295 (Fig. 23), which operates the dressing mechanism, at one end of the stroke of that piston. In addition, there are two limit switches 636 and 637 which are adapted to be tripped and closed, respectively, at opposite ends of the stroke of piston 160 (Figs. 8 and 23) which actuates the sliding base 106. Further, there is a limit switch 638 which is adapted to be tripped and closed on each stroke of the piston 73 (Figs. 23, 5 and 7) which actuates the mechanism that advances the grinding wheel step-by-step to compensate for wheel wear.

*Operation*

For gears with projecting front hubs, the sliding base 106 must be fully withdrawn from working position to permit loading and unloading of the work and for dressing. For gears without such hubs, the sliding base needs only to be withdrawn partially from working position for loading and unloading of the work and dressing may be effected, also, in the partially withdrawn or advanced position of the sliding base. Somewhat different control cams are used in the two cases. We shall describe first the automatic operation of the machine when the character of the work is such that the sliding base must be fully withdrawn for loading or unloading and dressing.

For automatic operation, the selector switch 640 is in the automatic position shown in Fig. 24, the valves 412, 416 and 452 are in the positions shown in Fig. 23, and the limit switches 490, 491 and 492 (Figs. 23 and 24) are therefore closed.

Assuming that the machine is stopped with the sliding base 106 in loading position, the hydraulic pump drive motor 380 (Figs. 23 and 24) is first started in the manner above described by pressing in start button 505. The work G is then chucked on the work spindle 100 by manipulating valve 396 (Fig. 23) to move the piston 397, which actuates the chucking mechanism, to chucking position. Then the wheel drive motor 55 is started as above described. When this is done the coil 550 of relay 555 is energized as above described; the switch arms 576, 577 and 578 of this relay are closed; and the switch arm 579 of this relay is opened, as above described.

When the arm 579 is opened, the circuit to the solenoid 371 (Figs. 11 and 24) is broken, while the closing of arm 578 makes a circuit to solenoid 372. This circuit is from the main line $L_1$, through the line 585, the line 586, the now-closed arm 578, the line 587, the solenoid 372, and the line 588 to main line $L_2$. This causes the valve 370 (Figs. 11 and 23) to be shifted to the left to shift piston 350 to the left in its cylinder, thus causing the drum 263 to be ratcheted one step in a clockwise direction through operation of rack 352, arm 354, pawl 357 and ratchet wheel 356.

Figure 4:
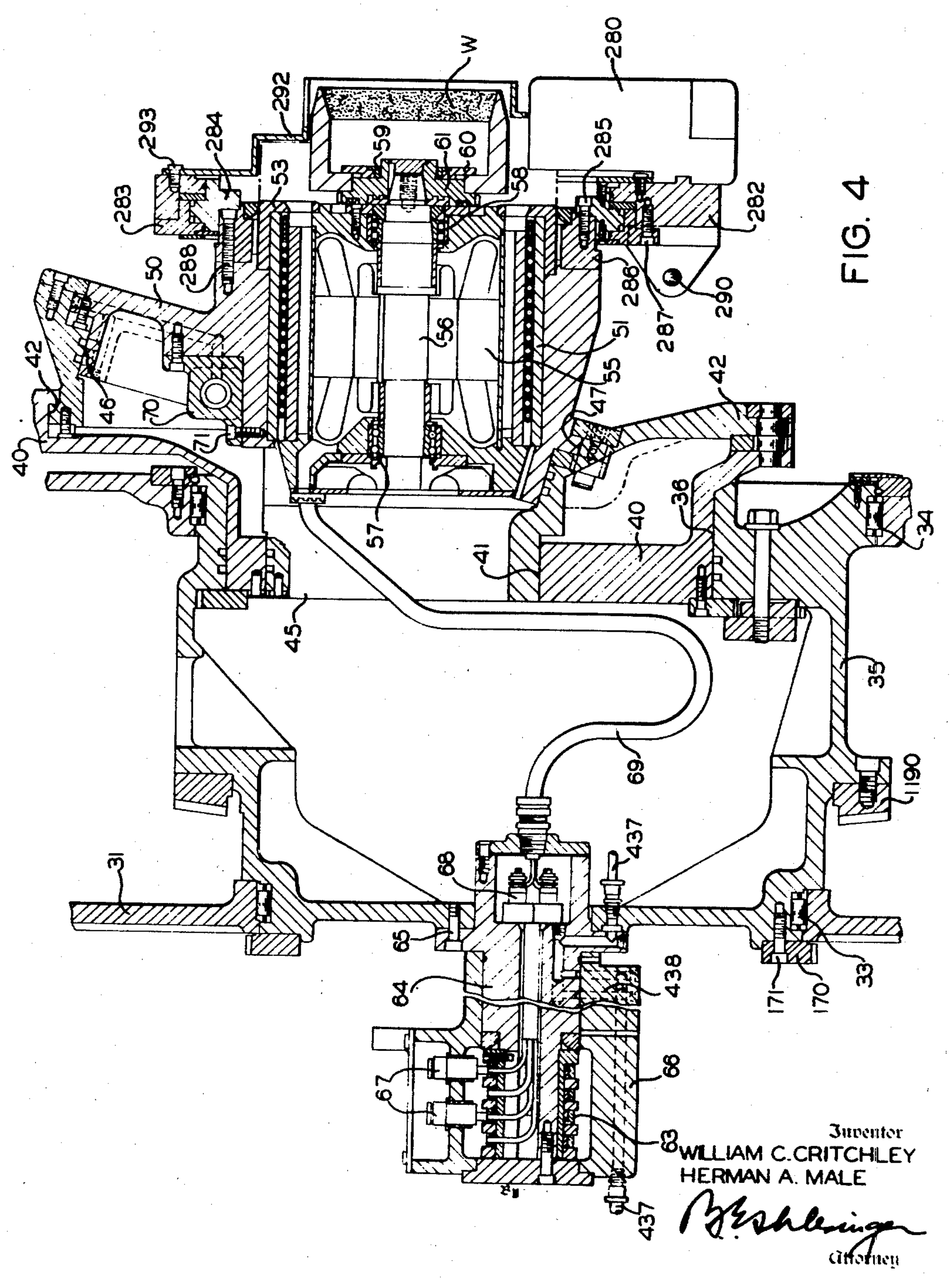
Fig. 4 is a fragmentary longitudinal sectional view through the tool carrying cradle, showing the mounting for the grinding wheel and its drive motor.

The clockwise rotation of the drum is a movement from left to right in the developed and schematic views of Figs. 13 and 14. The movement of the drum therefore causes the dog 269 of lever 301 (Fig. 12) to ride up on the protuberance 296 of the cam surface of the drum which is furthermost to the right. This shifts valve 300 downwardly from the position shown in Figs. 12 and 23, causing piston 295 to be moved upwardly. This is the resetting stroke of this piston and the dressing mechanism of the machine is therefore reset. At the end of its upward stroke, however, the piston 295 shifts valve 310 against the action of spring 312. This causes duct 438 to be put on supply and duct 437 on exhaust, causing piston 73 (Figs. 23, 5 and 7) to be moved in such direction as to cause pawl 80 to rotate ratchet wheel 77 through whatever distance is determined by the setting of piston-stop member 90. This rotates screw shaft 78 in nut 85 to advance support 53 which carries wheel drive motor 55 (Figs. 6 and 4). This advances the wheel W axially a distance sufficient for the desired amount of stock to be dressed off the wheel in the ensuing dressing operation so that the wheel will be sharp and keen, ready for grinding the work.

At the end of the stroke of the piston 350, the limit switch 565 is opened (Figs. 11 and 23) through pin 575, rod 574 and pin 573 (Figs. 10 and 11) to de-energize the coil 550 of relay 555. This causes switch arms 576, 577 and 578 to drop out but allows switch arm 579 to close. This causes solenoid 372 to be deenergized, but energizes solenoid 371, the circuit to the latter solenoid being made from line $L_1$ through lines 585, 586, 590, switch arm 579, line 591, solenoid 371, and line 588 to main line $L_2$. Energized solenoid 371 shifts the valve 370 (Figs. 11 and 23) back to starting position; and limit switch 565 again closes. The return of valve 370 to starting position, causes piston 350 to be returned to starting position and, with it, the pawl-carrier 356, the pawl 357 ratcheting idly over the teeth of the ratchet wheel, and the wheel being held in the position, to which it has been advanced, by dog 358.

Limit switch 562 opens when the drum 263 is advanced from starting position, opening the circuit to relay coil 550 through wheel start button 507.

While the pawl 357 is being reset, the wheel W is being advanced as above described. At the end of the advancing movement of the wheel, the piston 73 (Figs. 23, 5 and 7) closes the limit switch 638 momentarily. This momentarily energizes coil 550 of relay 555, the circuit to this coil being from main line $L_1$ through line 515, stop 506, line 530, now-closed switch arm 528, lines 518 and 517, limit switch 535, lines 536 and 537, stop button 508, lines 580, arm 549, lines 540, 600, 642 and 643, now-closed limit switch 638, lines 644, 645 and 646, limit switch 565, line 566, limit switch 490, line 567, limit switch 491, line 568, limit switch 492, line 569, arm 570 of switch 640, line 571, coil 550, lines 572 and 545 to main line $L_2$. This causes solenoid 372 to be energized again and solenoid 371 to be de-energized as above described, causing valve 370 and piston 350 controlled thereby to be again shifted to the left (Fig. 23) causing drum 263 (Figs. 10, 11 and 12) to be ratcheted another step. The nose 269 of lever 301 (Fig. 12) therefore rides down off the right-most protuberance 296 (Figs. 12 and 14) of cam plate 262; and valve 300 (Figs. 12 and 23) is shifted upwardly again. This causes piston 295 to move downwardly again, actuating the dressing mechanism of the machine to dress the grinding wheel. It also allows spring 312 to move valve 310 downwardly, resetting piston 73 and pawl 80 of the wheel advancing mechanism, thus allowing limit switch 638 to reopen.

At the end of the stroke of piston 350, solenoid 372 is de-energized and solenoid 371 is energized as above described. Thus valve 370, piston 350 and pawl-carrier 356 are reset as above described.

At the end of its downward stroke, piston 295 closes limit switch 635. This remakes the circuit to solenoid 372 and de-energizes solenoid 371, the circuit being the same as when limit switch 638 is closed except that now line 642 is connected with line 645 through line 648, switch 635 and line 649. Valve 370 and piston 350 are therefore again shifted, again causing drum 263 (Figs. 10 and 11) to be moved a step.

This causes the nose 269 (Fig. 12) of the lever 343 (Fig. 10), which operates valve 340 (Fig. 23), to ride up the first step 346 of the right-most protuberance 345 (Figs. 14 and 13) of cam plates 262. This shifts valve 340 down part-way in its cylinder, causing sliding base 106 to carry the work in to working position under actuation of piston 160 (Figs. 23 and 8).

At the end of its movement piston 350 trips limit switch 565 (Figs. 11 and 24), solenoid 371 is energized and solenoid 372 is de-energized, as before, and the piston is reset and with it pawl 357.

As the piston 160 moves in, it allows limit switch 636 to open, but closes limit switch 637. This again makes the same circuit as when limit switch 635 or 638 is closed as above described except that now limit switch 637 connects lines 642 and 645. Solenoid 372 is therefore again energized and solenoid 371 is de-energized. Valve 370 and piston 350 are therefore again shifted to cause pawl 357 to again advance drum 263 one step. Valve 370 and piston 350 then reset as above described.

The movement of drum 263 causes the nose 269 (Fig. 12) of the lever 343 (Fig. 10) which operates valve 340 (Fig. 23) to ride up onto the very top land of the right-most protuberance 345 (Figs. 14 and 13) of cam plate 332. This allows valve 340 to complete its downward movement. When it does this, limit switch 610 (Figs. 23 and 24) is closed by the valve, and a circuit is made to coil 612 of controller 501. This circuit is from line $L_1$ through line 515, stop button 506, line 530, arm 528, lines 518 and 517, switch 535, lines 536 and 537, stop button 508, line 580, now-closed arm 549, lines 540, 539 and 625, switch arm 626 of double-throw switch 640, lines 627 and 607, switch 610, line 611, coil 612, and lines 613 and 545 to main line $L_2$. This starts the main motor 500.

The circuit to this motor is maintained after starting through now-closed arm 618, line 620 connecting line 607 with line 539 through this arm, line 621, stop-button 510, line 604, automatic stop 605, and lines 602, 601 and 600.

The main motor drives the generating mechanism, which includes drum cam 130 (Fig. 9). The drum cam, as described makes one revolution for each tooth space of the work. As the drum revolves, lever 136 causes cylinder 155 (Figs. 8 and 23) to be moved bodily to move the sliding base from working position toward the wheel until the work is in operative engagement with the wheel.

The trackway 131 of cam 130 is of conventional shape. It has an inclined portion for producing the movement of the work into operative position, a dwell for holding the work in operative posiiton during grinding, a reversely inclined portion for withdrawing the work from operative position after the grinding operation in the tooth space, and another dwell portion which holds the work in withdrawn position while the work is being indexed.

The wheel is, of course, rotating continuously, and as the work comes into operative engagement with the wheel, wheel and work are rolled together through timed rotation of work spindle 100 and the cradle 35 through operation of the generating mechanism of the machine. If it is desired to eliminate bias bearing by a helical motion, the gear train 170, 172, 176, 179, 180, 187, 192 or the gear train 170, 172, 176, 179, 181, 182, 183, 187, 192 (Fig. 8) is employed, depending on the direction of helical motion desired, to drive nut 193 to cause continuous movement of sliding base 106 during the generating roll. If no helical motion is desired, gear 179 can be left off and no motion will then be transmitted by the cradle 35 to nut 193.

The cycles of feed of the work into operative engagement with the wheel, generating roll of work and wheel together with or without helical motion, withdrawal of the work, and indexing of the work proceed until a grind has been effected in each tooth space of the work, that is, until the work has been indexed through a revolution. Then the automatic stop 605 is tripped. This closes a circuit from main line $L_1$, through line 515, stop button 506, line 530, arm 528, lines 518 and 517, limit switch 535, lines 536 and 537, stop button 508, line 580, arm 549, lines 540, 600 and 601, now shifted automatic stop switch 608, lines 603 and 646, limit switch 565, line 566, limit switch 490, line 567, limit switch 491, line 568, limit switch 492, line 569, switch arm 570, line 571, coil 550 of relay 555, and lines 572 and 545 to main line $L_2$. The energizing of coil 550 opens arm 579 to de-energize solenoid 371, and closes arm 578 to energize solenoid 372 as above described, and once more valve 370 and piston 350 are shifted to cause pawl 357 (Fig. 11) to advance ratchet wheel 356.

This causes nose-piece 269 of level 271 (Fig. 12) to ride up on the right-most protrusion or lobe 278 of the cam plate 262 to shift valve 260 (Figs. 12 and 23) downwardly. This causes piston 225 (Figs. 23, 17 and 18) to rock pawl carrier 230 in a counterclockwise direction so that pawl 232 effects a movement of ratchet wheel 233, rotating shaft 204 a step. Whichever cam 200 (Figs. 16 and 8) is in operative engagement with roller 208 thus advances the sliding base 106 a step so that the grinding wheel will grind deeper into the work on the next grinding pass. Cam shaft 204 is rotated clockwise as viewed in Fig. 8 and the work is at greatest depth when the roller 208 is on the lowest part of a cam 200.

Limit switch 560 (Figs. 23 and 24) opens when sleeve 234 is moved in the above described step. This switch and limit switch 562, which cooperates with drum 263 (Figs. 10 and 24) insure that both the feed rate cam 200 and the sequence drum 263 are reset before the initial movement of the ratchet 356 (Fig. 11) which rotates the drum.

At the completion of its stroke, piston 350 (Figs. 11 and 23) trips limit switch 565; and valve 370, piston 350, and pawl carrier 356 are thereupon reset in the manner previously described. Limit switch 258 is tripped at the end of the ratcheting swing of pawl carrier 230. This causes lines 642 and 645 (Fig. 24) to be connected through line 650, limit switch 258, and lines 651 and 646, causing solenoid 372 to be energized again and solenoid 371 to be de-energized. This causes drum 263 to be advanced another step and nose 269 of lever 271 (Fig. 12) rides down off the right-most protuberance 278 (Figs. 13 and 14) of cam 262.

This causes valve 260 (Figs. 12 and 23) to be shifted upwardly; and thus feed cam rate piston 225 (Figs. 17, 18 and 23) is reset. Piston 350 trips limit switch 565 at the end of its stroke; solenoid 371 is energized; solenoid 372 is de-energized, valve 370 and piston 350 are returned to starting position as previously.

The main drive motor 500 has been stopped during the described advance of the feed-rate cam 200, but the shifting of automatic stop switch 608 is only momentary and this switch arm shifts back immediately to connect lines 602 and 604 again, re-starting the main drive motor.

The next grinding pass around the work is then made, that is, a grind is made in each tooth space of the work in the regular working cycle of feed of the work into operative engagement with the wheel, generating roll of the wheel and work together in engagement with or without the helical motion, withdrawal of the work, and indexing of the work.

After the completion of this grinding pass, the automatic stop 605 trips again to stop the main motor 500. The work may then be fed a step into the wheel as previously described by shifting valve 260, piston 225 and ratchet wheel 233, and then, the grinding may be resumed, or the sliding base may be fully withdrawn, the wheel dressed, and the work advanced before grinding is resumed. With the cams illustrated in the drawings (Figs. 13 and 14) there are four step-by-step advances of the work through step-by-step advance of the feed-rate cam 200, which is governing the work feed, before the wheel is dressed. That is, the work is ground all the way around five times with a depthwise advance of the work into the wheel between each grind before the work is withdrawn clear of the wheel and the wheel is dressed. The arrangement of the lobes 278 and 296 on the cam plates 262 control the frequency of feed and of dressing; and obviously, by use of different cams, a different frequency of dressing may be obtained.

With the cams illustrated, dressing, as stated, is effected after the fifth grinding pass. When the automatic stop 605 trips at the end of this pass, it stops main drive motor 500 and causes solenoid 372 to be energized and solenoid 371 to be deenergized as described above. This causes piston 350 to advance drum 263 a step as above described.

This causes the nose of lever 343 (Fig. 10) to ride down off the top land of the right-most lobe 345 of cam 262 (Fig. 14), causing valve 340 (Fig. 23) to be shifted upwardly, and causing piston 160 to withdraw sliding base 106 to loading position. On this movement limit switch 637 (Figs. 23 and 24) opens but at the end of it limit switch 636 closes.

Closing of limit switch 636 connects lines 642 and 645 through line 653, limit switch 636, and line 654. This energizes solenoid 372 and de-energizes solenoid 371 as above described. Once again, then, piston 350 is shifted to advance drum 263 a step and once again, too, at the end of its stroke, piston 350 trips limit switch 565 (Figs. 11 and 24) to cause valve 370 to be reset by de-energizing solenoid 372 and energizing solenoid 371.

The advance of drum 263 causes the nose of lever 301 to ride up on the second protuberance 296 (Figs. 13 and 14) of cam 262 shifting valve 300 (Figs. 12 and 23) upwardly. This shifts piston 295 and valve 310 upwardly, resetting the dressing mechanism and causing piston 73 (Figs. 23, 5 and 7) to advance the grinding wheel the amount which it is desired to dress off of it, as already described.

At the end of the advance of the grinding wheel, piston 73 trips limit switch 638. This causes solenoid 372 to be energized and solenoid 371 to be de-energized. Once more, then, pawl 357 advances ratchet wheel 356 and drum 263. Once more, also, after the advance is completed, solenoid 371 is energized and solenoid 372 is de-energized and piston 350 and pawl 357 are reset.

The nose of lever 301 (Fig. 12) then rides down off the second protuberance 296 of cam 262; valve 300 is shifted upwardly and piston 295 moves downwardly to actuate the dressing mechanism to dress the grinding wheel. Simultaneously valve 310, piston 73 and the wheel-advancing mechanism are reset.

As the piston 295 moves downwardly it trips limit switch 635 (Figs. 23 and 24), causing solenoid 372 to be energized again and solenoid 371 to be de-energized as above described. This advances drum 263 another step. The nose of lever 343 (Fig. 10) now rides up on the first land 346 of the second protuberance 345 of cam 262 (Figs.

13 and 14). Valve 340 is, therefore, shifted to cause piston 160 to move sliding base 106 into working position.

As the sliding base moves in, limit switch 636 is opened; but as the end of the movement of the sliding base limit switch 637 is closed. This causes drum 263 to be advanced another step through energization of solenoid 372 as described above.

This causes the nose of lever 271 (Fig. 12) to ride up on the next protuberance 278 of cam 262 and feed rate piston 225 is shifted, as before, to advance the feed rate cam 200, which is then in operative position, thereby advancing sliding base 106 and the work.

At the end of the advancing movement of pawl carrier 230, limit switch 258 is tripped to again energize solenoid 372 and de-energize solenoid 371. Thus drum 263 is advanced another step to cause the nose of lever 343 (Fig. 10) to ride up on the top land of second protuberance 345 and to cause the nose of lever 271 (Fig. 12) to ride down off the protuberance 278 on which it has been riding. The first causes valve 340 to be shifted fully down to trip limit switch 610. This causes main motor 500 to be restarted as described above. The second causes valve 260 to be shifted downwardly and piston 225 to be reset.

Another grinding pass is made in all the tooth spaces of the work.

The operations proceed as above described until after stoppage of main motor 500 at the end of the last roughing grind on the teeth of the work. Then when drum 263 is advanced at the end of the withdrawal of sliding base 106 to loading position, the nose of lever 333 (Fig. 10) will ride up on the protuberance 337 (Figs. 13 and 14) when the nose of lever 271 (Fig. 12) is riding up on the last protuberance 296 of cam 262. This will cause valve 330 to be shifted downwardly simultaneously with the resetting of piston 295 under control of valve 300.

Shift of valve 330 will cause throttle valve 320 instead of throttle valve 321 to control the rate of exhaust from the underside of piston 295 on the ensuing dressing movement of piston 295, for when valve 330 is shifted downwardly, the lower side of piston 295 must exhaust on its downward, dressing stroke through ducts 423, 422 and 447, valve 330, duct 440, throttle valve 320, ducts 446 and 420, valve 300, and ducts 471, 472, 463 and 391 to the sump. Since throttle valve 320 will be adjusted for a slower rate of exhaust from the underside of piston 295 than throttle valve 321, then, the grinding wheel will be dressed at a slower rate and be given a finer finish for finishing grinding.

When the finish-dressing is completed, the sliding base 106 will be returned to working position and the main motor 500 restarted as before. The feed cam 200 will then be advanced a step, prior to the return of the sliding base into working position under control of a protuberance 278 of cam 162, valve 260, piston 225 and pawl-carrier 230 as already described. If the work is to be ground at greater depth on the finish grinding operation, the feed cam 200 will be constructed to produce this feed. If the finish-grind is to be at the same depth as full roughing-depth, the feed cam 200 may have a dwell portion which has a uniform radial distance from the axis of this cam and which will consequently effect no change in the depth position of the work despite the rotational advance of the cam. The dwell of the work at full roughing depth for finish-grinding might also be achieved by omitting from cam 262 the last protuberance 278 to the left (Figs. 13 and 14). Then cam 200 would not be ratcheted prior to the finish-grind.

For the movement of the sliding base to operating position, the nose of cam lever 343 (Fig. 10) will ride up on the first land of the last protuberance 345 of cam 262 and valve 340 will only move part-way down, but on completion of this return movement of the sliding base, the valve 340 will complete its downward movement as above described.

After the gear has been finish-ground, the automatic stop 605 trips as before stopping main motor 500. The drum 263 is also advanced, as before. This causes the nose of lever 343 (Fig. 10) to ride down off the last protuberance 345 of cam 262. This causes valve 340 (Fig. 23) to be moved upwardly to cause piston 160 to withdraw the sliding base 106 to loading position. At the end of the withdrawal movement limit switch 636 is closed to cause the drum 263 to advance another step. This causes the trip member 533 (Fig. 10) to trip limit switch 535.

This breaks the circuit to the wheel motor 55 stopping the wheel. It also makes a circuit from line $L_1$ through line 515, stop button 506, line 530, arm 528, lines 518, 517 and 628, switch arm 633, line 629, light 630, and lines 631 and 588 to main line $L_2$. This illuminates a light 630, which may be placed at any convenient spot on the machine, to warn the machine operator that the job has been completed.

When limit switch 565 (Figs. 11 and 24) is opened at the end of the last movement of piston 350, the circuit to the coil 550 of relay 555 is broken. The main motor 500 therefore does not restart automatically.

With the sliding base in loading position, the operator rotates valve 396 (Figs. 3 and 23) to dechuck the work by movement of piston 397. The shift of the valve 396 simultaneously reverses the direction of flow of the motive fluid to pistons 243 and 362 (Figs. 23, 17 and 11) and puts lines 386 and 485 once more on supply moving these pistons to the positions shown in Fig. 23. The pistons 243 and 362 trip the pawls 239 and 358, respectively, out of engagement with the ratchet wheels 233 and 356, respectively, while the pistons 250 and 350 operating through the rack 252 and pinion 253 (Fig. 18) and through the rack 352 and segment 354 (Fig. 11), respectively, reset the ratchet wheels 233 and 356, respectively, and through these ratchet wheels the drum 263 and cams 200, respectively. Thus the various parts of the machine are returned to starting position, the hydraulic pump motor 380 (Figs. 23 and 24) being the only one to continue running. This is stopped manually at the end of the day or at the end of a run of work.

As previously stated, the screw stop 254 (Figs. 18 and 23) determines the amount of resetting movement of piston 250 and therefore the number of step-by-step advancing movements of cam 200 which controls the depth of feed of the work. Hence, any desired depth-feed of the work under control of a given cam 200 can be obtained by adjustment of screw 254, the graduations 246 (Fig. 16) on sleeve 234 serving to permit this adjustment to be made accurately. One cam 200, therefore, may serve to give different depths of feed depending on the number of step-by-step movements for which screw 254 is adjusted. By shifting from one cam 200 to another further control over the depth of feed may be obtained, for these cams have different shapes, that is, different eccentricities.

By changing cam plates 262 and 332 (Figs. 13 and 14) different cycles can be obtained. These cams serve to control the number of grinds, whether the work is advanced into the wheel after a grind, and whether the wheel is dressed after a grind or not.

As previously stated, for certain types of work it is not necessary to withdraw the sliding base 106 to loading position when it is desired to dress the grinding wheel. Instead, the wheel can be dressed with the sliding base in advanced, that is, working position. This is possible when the dressing tool 281 (Fig. 3) clears the work in all positions of its dressing movement with the sliding base in working position.

Where it is possible to dress in the advanced position of the sliding base, this is done because of the saving in time; it is not necessary to withdraw the sliding base to loading position before actuating the dressing mechanism. In general the operations are the same as above described, but there are some differences as will now be outlined, and different control cams 262' (Fig. 25) have to be used. The only difference between cams 262 and 262', however, as will be seen by comparison of Figs. 14 and 25, is in the portions of the cams which control the movement of valve 330 (Fig. 23). The protuberances 345' of cam 262' have only one step, while the protuberances 345 of cam 262 have two steps, and cam 262' has a rise 347' leading to the first land 346' and a return drop portion 348' leading from the top land of its last protuberance 345'.

*Operation with wheel dressed in advanced position of sliding base*

In the cycle where the wheel is dressed with the sliding base in advanced position, the operator first starts the pump motor 380 (Figs. 23 and 24) as above described. Then he chucks the work by manipulating valve 396 (Figs. 3 and 23). Then the wheel motor 55 is started. This energizes coil 550 of relay 555, closing arm 578 to make a circuit to solenoid 372. The drum 263 is therefore ratcheted through its first step as before.

In this case, however, the lever 343 (Fig. 12) is the first to be rocked, its nose riding up on the rise 347' of cam 262' (Fig. 25). This causes valve 340 to be shifted part-way downwardly as before, causing sliding base 206 to be moved into advanced or working position. Limit switch 637 (Figs. 23 and 24) is then tripped as before to cause solenoid 372 again to be energized, causing drum 263 to be moved another step.

On this step, lever 301 (Fig. 12) is rocked to shift valve 300. This effects resetting movement of piston 295, as before, which in turn trips valve 310 and causes piston 73 to advance grinding wheel W axially as before. At the end of this movement of piston 73, limit switch 638 is tripped, as before, causing solenoid 372 again to be energized and drum 263 again to be moved a step as before.

This causes valve 300 to be moved upwardly, as before, causing piston 295 to effect the dressing stroke of the dressing mechanism, and allowing piston 73 to be reset. At the end of the downward dressing stroke of piston 295, limit switch 635 is tripped as before. This causes solenoid 372 again to be energized and drum 263 again to be moved a step.

This causes the nose of lever 343 (Fig. 10) to ride up on the top of protuberance 345' of cam 262' (Fig. 25) causing valve 340 (Fig. 23) to be moved fully downwardly. At the end of its downward movement, valve 340 trips limit switch 610, starting feed motor 500 as before.

The machine then goes through a grinding operation as before. In this operation, for each tooth space of the work the work is fed into operative engagement with the wheel by lever 136 (Figs. 9 and 8), the work and wheel are rolled togther through rotation of work spindle 100 and cradle 35 with or without helical motion of the work as may be desired, the work is withdrawn by lever 136, and the work is indexed by the indexing mechanism of the machine which may be the same as that of application Serial No. 779,890 above mentioned.

When the work has been indexed through a revolution and a grind has been effected in each tooth space thereof, the automatic stop 605 is tripped as before. This causes solenoid 372 again to be energized as before and drum 263 again to be moved a step.

This causes valve 260 to be shifted downwardly as before, causing piston 225 to be shifted as before. As before this causes a step movement to be imparted to cam 200 to advance the sliding base 106 and the work toward the grinding wheel. As before, at the end of this movement, limit switch 258 is tripped. This causes solenoid 372 to be energized once more and drum 263 is therefore again moved a step.

This causes valve 260 to be reset, resetting piston 225 and the pawl carrier 230. Then, as before, main motor 500 is restarted and a new grinding pass around the work is made, the tooth spaces of the work being generated-ground, as before, at the new depth to which the work has been allowed to advance by the shift of cam 200.

At the end of this grinding pass, the automatic stop 605 again trips causing drum 263 to be moved one more step as before. This stops main motor 500. The work may then be fed further into depth as before, before the main motor is restarted, or the wheel may be advanced and dressed, and the work fed in before restarting motor 500, the operation depending upon the shape of the control cams 262'. With the form of cam illustrated in Fig. 25, the work is advanced step-by-step three times through operation of cam protuberances 278' before the wheel is dressed.

When the wheel is to be dressed, the advance of drum 263 causes the nose of lever 343 to ride down off the top of land 345' into land 346' and the nose of lever 301 (Figs. 10 and 12) to ride up on second protrusion 296'. This shifts valves 340 and 300, respectively. The former moves upwardly only far enough to disengage limit switch 610; piston 160 and sliding base 106 do not move. The latter causes piston 295 to be reset, and piston 73 to advance the wheel W, as before.

At the end of its advancing movement, piston 73 trips limit switch 638 as before, and solenoid 372 is again energized. This causes drum 263 to be rotated another step. Valve 300 is then moved upward to cause piston 295 to actuate the dressing mechanism in its dressing stroke, as before.

At the end of its downward stroke piston 295 trips limit switch 635 as before. This causes solenoid 372 again to be energized and drum 263 again to be rotated a step. This causes valve 260 to be moved down as before and piston 225 to be shifted as before to rotate cam 200 a step to advance sliding base 106 and the work toward the grinding wheel.

At the end of this movement, limit switch 258 is tripped as before to again energize solenoid 372. This causes drum 263 to be rotated another step, shifting valve 300 upwardly. This causes piston 295 and piston 73 to be reset. At the same time, valve 340 is moved down to trip limit switch 610 to restart main motor 500.

The next grinding pass around the work is then made.

As before prior to the last grind, the grinding wheel is finish-dressed. The lobe 337′ of cam 262′ takes care of this, for when the main motor has been stopped at the end of the last rough-grinding operation on the work, the step-rotation of drum 263 causes valve 330 to be moved down at the same time as valve 300 is being moved down. Hence, control of the dressing stroke of piston 295 is shifted from throttle valve 321 to throttle valve 320 at the same time that the dresser piston 295 is being reset.

When limit switch 638 is tripped by piston 73 to rotate drum 263 again a step, piston 295 will move downwardly at a rate controlled by throttle valve 320 to finish-dress the wheel as before. Valve 330 is shifted upwardly again, to restore control of throttle valve 321 over the rate of dressing, when drum 263 is advanced again by tripping of limit switch 635 at the end of the finish-dressing stroke of piston 295.

On completion of the dressing of the wheel, the main motor 500 is started as before and a finish grinding pass is taken around the work as before. Ordinarily, as already stated, the work is not fed further into the wheel prior to the finish grinding pass but is ground at the same depth as in the last rough-grinding operation. The finish-grinding pass is then simply a cleaning up operation. However, if desired, the finish-grind may be made at greater depth than rough-grinding. All that is required is use of a suitable feed cam 200.

When the gear has been finish-ground, the automatic stop 605 trips as before; solenoid 372 is again energized and drum 263 is again moved a step. This causes the nose of lever 343 (Fig. 10) to ride down return portion 348′ of cam 262′ causing valve 340 to be moved up, stopping main motor 500 and causing piston 160, as before, to withdraw sliding base 106 to loading position. On this movement, limit switch 636 is tripped, as before, to cause solenoid 372 again to be energized and drum 263 again to be advanced a step. Trip member 533 (Fig. 10) of drum 263 now trips limit switch 535, as before, stopping wheel motor 55 as before, and causing warning light 630 to be illuminated.

As before the operator then rotates valve 396 to dechuck the work and trip pawls 239 and 359 out of engagement with their ratchet wheels 233 and 356, respectively, resetting the feed cams 200 and drum 263. The machine cycle is cómpleted.

With its continued advance and dressing a grinding wheel will finally be worn and dressed down to a point where it is no longer usable. To prevent advance of the grinding wheel beyond this point, the button 96 (Fig. 5) on nut 86 is provided. When the wheel has been advanced to the practical limit of its useful life, this button engages the plunger 97 of limit switch 98 (Figs. 5 and 24), tripping this switch and closing a circuit from main line $L_1$, through line 515, limit switch 98, line 656, light 658, and lines 659 and 588 back to main line $L_2$. This illuminates light 658, warning the operator that it is time to change the grinding wheel. Of course, switch 98 might be used to stop the machine if desired.

While the invention has been described in connection with particular embodiments thereof, it will be understood that it is capable of further modification, and this application is intended to cover any variations, uses, or adaptations of the invention, following, in general, the principles of the invention and including such departures from the present disclosure as come within known or customary practice in the gear art and as may be applied to the essential features hereinbefore set forth and as fall within the scope of the invention or the limits of the appended claims.

Having thus described our invention, what we claim is:

1. In a machine for grinding gears, a work support, a tool support, a grinding wheel rotatably mounted on said tool support, means for producing relative movements between the work and the wheel to effect grinding operations on the tooth sides of the work, means for periodically stopping the grinding operations, a dresser for the wheel, feed means shiftable step-by-step to increase the depth of grinding engagement of the work with the wheel, means for shifting the feed means a step during each period of stoppage of the grinding operations, means for actuating the dresser, and a control member operable step-by-step in the operation of the machine to control the operations of the feed means and of dresser actuating means and to determine whether one or both means will be actuated on stoppage of the grinding operations.

2. In a machine for grinding gears, a work support, a tool support, a grinding wheel rotatably mounted on said tool support, a dresser for the wheel, means for effecting relative movements between the tool and work supports to cause the wheel to grind successively in different tooth spaces of the work, feed means shiftable step-by-step to increase the depth of grinding engagement of the work with the wheel, means for shifting the feed means, means for moving one of said supports away from the other to move the work relatively out of operative position, means operable, when the work is out of operative position, to actuate the dresser to effect dressing of the wheel, means for periodically stopping the grinding operations after a predetermined number of grinding operations, and a control member operable step-by-step in the operation of the machine to control the operations of the first three of the four last-named means and to determine whether all three such means will be actuated on stoppage of the grinding operations or only the means for shifting the feed means.

3. In a machine for producing gears, a work support, a work spindle journaled in the work support, a tool support, a tool mounted on the tool support, an oscillatory cradle on which one of said supports is mounted, a rotary cam, means operatively connecting said cam to one of said supports to move the tool and work alternately into and out of operative engagement, means for rotating the cradle and work spindle in timed relation while the tool and work are in engagement to effect generation of the tooth profiles of the work, means operable during the time tool and work are out of engagement to index the work, and means actuated by the rotation of the cradle for moving said connecting means relative to the cam to change the relative depthwise positions of tool and work during generation.

4. In a machine for producing gears, a work support, a work spindle journaled in the work support, a tool support, a tool mounted on the tool support, a slide on which one of said supports is mounted, an oscillatory cradle on which the other support is mounted, means for effecting movement of the tool and work into and out of operative relation comprising a rotary cam, a follower engaging said cam, and two relatively slidable members, one of which carries the follower and the other of which is secured to the slide, means for rotating the cradle and work spindle in timed relation to effect generation of the tool profiles, and means operable on rotation of the cradle for moving said slidable members relative to one another.

5. In a machine for producing gears, a work support, a work spindle journaled in the work support, a tool support, a tool mounted on the tool support, a slide on which one of said supports is mounted, an oscillatory cradle on which the other support is mounted, means for effecting movement of the tool and work into and out of operative relation comprising a rotary cam, a follower engaging said cam, and two relatively slidable members, one of which carries the follower and the other of which is secured to the slide, means for rotating the cradle and work spindle in timed relation to effect generation of the tool profiles, a cooperating screw and nut for moving one of said slidable members relative to the other, and gearing operatively connecting one of said cooperating parts with the cradle to rotate said part on rotation of the cradle.

6. In a machine for producing gears, a work support, a tool support, a tool mounted on the tool support, a slide on which one of said supports is mounted, means for moving the tool and work into and out of operative engagement comprising a rotary cam, a follower engaging said cam, and two slidable members, one of which carries said follower and the other of which is connected to said slide, and means for controlling the depth of engagement of tool and work comprising a second cam, and a follower carried by the second slidable member and engaging the second cam.

7. In a machine for producing gears, a work support, a tool support, a grinding wheel journaled in the tool support, a slide on which one of said supports is mounted, means for moving the tool and work into and out of operative engagement comprising a rotary cam, a follower engaging said cam, and two relatively slidable members, one of which carries said follower and the other of which is connected to said slide, and means for periodically varying the depth of engagement of the wheel and work comprising a second rotary cam, which has an operative surface at a varying distance from its axis, a follower carried by the second slidable member and engaging the second cam, and means for rotating said second cam step-by-step periodically after completion of grinding operations in all the tooth spaces of the work.

8. In a machine for producing gears, a work support, a tool support, a tool mounted on the tool support, a slide on which one of said supports is mounted, a pair of relatively slidable members which are operatively connected to one another, one of which is connected to the slide, means for imparting movement alternately in opposite directions to the other of said members to effect periodic alternate relative movements of tool and work to and from operative engagement, means for moving the said one member in opposite directions to effect relative movements of tool and work between loading and working positions, and means for moving the said one member independently of the last-named means to vary the relative depth of engagement of tool and work.

9. In a machine for producing gears, a work support, a tool support, a slide on which one of said supports is mounted, a pair of slidable members, one of which is connected to the slide, a rotary cam and a follower engaged therewith for moving the other slidable member, means for transmitting motion from said other slidable member to said one slidable member which is connected to the slide, a second cam and follower for moving the said one slidable member, and a cylinder connected to one of said slidable members, a piston reciprocable in said cylinder and connected to the other slidable member, and means for supplying a pressure fluid to opposite sides of said piston selectively to move said slidable members relative to one another and thereby effect movement of the slide.

10. In a machine for producing gears, a work support, a work spindle journaled therein, a tool support, a tool mounted thereon, a slide on which one of said supports is mounted, an oscillatory cradle on which one of said supports is mounted, a pair of relatively slidable members, one of which is connected to the slide, means for rotating the cradle and work spindle in timed relation to effect generation of the tooth profiles of the work, means for moving one of said members to effect alternate relative movement of the tool and work into and out of operative engagement, means for moving the other member in opposite directions to effect relative movements of tool and work between loading and working positions, and means operable on rotation of the cradle for additionally moving one of said members in one direction or the other to effect relative depthwise movement between tool and work during generation.

11. In a machine for producing gears, a work support, a work spindle journaled therein, a tool support, a tool mounted thereon, a slide on which one of said supports is mounted, an oscillatory cradle on which one of said supports is mounted, a pair of relatively slidable members, one of which is connected to the slide, means for rotating the cradle and work spindle in timed relation to effect generation of the tooth profiles of the work, means for moving one of said members to effect alternate relative movements of the tool and work into and out of operative engagement, means for moving the other member in opposite directions to effect relative movements of tool and work between loading and working positions, means operable on rotation of the cradle for additionally moving one of said members in one direction or the other to effect relative depthwise movement between tool and work during generation, and means for moving one of said members step-by-step to effect stepwise variation in the depth of engagement of tool and work when engaged.

12. In a machine for producing gears, a work support, a work spindle journaled therein, a tool support, a tool mounted thereon, a slide on which one of said supports is mounted, an oscillatory cradle on which one of said supports is mounted, means for rotating the cradle and work spindle in timed relation to effect generation of the tooth profiles of the work, a pair of slidable members, one of which is connected to the slide, a cam and a follower engaged therewith for moving the other member, means for connecting said members together so that movement of said other member is transmitted through said one member to the slide, a cylinder secured to one of said members, a piston reciprocable in said cylinder and connected to the other member, means for supplying a pressure fluid selectively to opposite sides of said piston to move said members relative to one another and thereby effect movement of the slide, means for additionally moving one of said members independently of the other, and gearing driven on rotation of the cradle for actuating the last-named means.

13. In a machine for producing gears, a work support, a work spindle journaled therein, a tool support, a tool mounted thereon, a slide on which one of said supports is mounted, an oscillatory cradle on which one of said supports is mounted, means for rotating the cradle and work spindle in timed relation to effect generation of the tooth profiles of the work, a pair of slidable members, one of which is connected to the slide, a cam and a follower engaged therewith for moving the other member, means for connecting said members together so that movement of said other member is transmitted through said one member to the slide, a cylinder secured to one of said members, a piston reciprocable in said cylinder and connected to the other member, means for supplying a pressure fluid selectively to opposite sides of said piston to move said members relative to one another and thereby effect movement of the slide, means for independently moving one of said members relative to the other on rotation of the cradle comprising gearing actuated by the cradle in its movement, a cooperating screw and nut, one of the two last-named parts being operatively connected to the gearing and the other to said independently movable member, and a cam and follower engaged therewith for moving said first member independently of the other means for moving said members.

14. In a machine for producing gears, a work support, a work spindle journaled therein, a tool support, a tool mounted thereon, a slide on which one of said supports is mounted, an oscillatory cradle on which one of said supports is mounted, a cylinder and a piston reciprocable therein, said piston being connected to said slide, means for supplying a pressure fluid selectively to opposite sides of the piston to move the slide, means operable on rotation of the cradle for moving said piston axially to effect separate movement of the slide, and a second cam and follower for moving said piston axially also to effect movement of the slide.

15. In a machine for grinding gears, a rotary cradle, a support mounted in said cradle for adjustment about two intersecting axes, a motor mounted in said support, and a rotary annular grinding wheel secured to the armature shaft of said motor, and means for adjusting the motor and wheel step-by-step on said support axially of the motor shaft to compensate for wear of the wheel.

16. In a machine for grinding longitudinally curved tooth tapered gears, a frame, a cradle rotatably mounted on the frame and adjustable thereon through an angle of 360°, a drum mounted eccentrically in the cradle for adjustment therein through an angle of 360° about an axis offset from but parallel to the cradle axis, a head mounted eccentrically in the drum for adjustment therein through an angle of 360° about an axis offset from but parallel to the axis of adjustment of the drum, a carrier mounted in the head for adjustment therein through an angle of 360° about an axis inclined to and intersecting the axis of adjustment of the head, a motor mounted in the carrier with its armature shaft inclined to and intersecting the axis of adjustment of the carrier, and a rotary grinding wheel secured to said shaft coaxially thereof.

17. In a machine for grinding longitudinally curved tooth tapered gears, a frame, a cradle rotatably mounted on the frame and adjustable thereon through an angle of 360°, a drum mounted eccentrically in the cradle for adjustment therein through an angle of 360° about an axis offset from but parallel to the cradle axis, a head mounted eccentrically in the drum for adjustment therein through an angle of 360° about an axis offset from but parallel to the axis of adjustment of the drum, a carrier mounted in the head for adjustment therein through an angle of 360° about an axis inclined to and intersecting the axis of adjustment of the head, a support slidably mounted in the carrier, a motor mounted in the support with its armature shaft inclined to and intersecting the axis of adjustment of the carrier, a rotary grinding wheel secured to said shaft coaxially thereof, said support being slidable in the carrier in the direction of the axis of said shaft, and means for effecting step-by-step movement of the support in the carrier to compensate for wear of the grinding wheel.

18. In a machine for grinding gears, a frame, a tool support mounted on the frame, a rotary annular grinding wheel journaled in said tool support, a base mounted on the frame for angular adjustment thereon, a slide reciprocable on the base, a work support mounted on the slide, and means for reciprocating the slide to move the work into and out of engagement with the wheel, the angular adjustment of the base on the frame permitting positioning the slide so that it may be reciprocated in a direction bisecting the angle between the outside and the inside surfaces of the grinding wheel.

19. In a machine for grinding gears, a frame, a rotary cradle journaled in the frame, a tool support mounted in the cradle for adjustment about two angularly disposed axes, a grinding wheel journaled on said tool support, a base mounted on the frame for adjustment about an axis extending at right angles to the axis of the cradle, a slide reciprocable on the base, a work support mounted on the slide, and means for reciprocating the slide to move the work depthwise relative to the wheel.

20. In a machine for grinding gears, a work support, a work spindle journaled in the work support, a tool support, a grinding wheel journaled on said tool support, a slide on which one of said supports is mounted, a dresser for dressing the grinding wheel, means for effecting relative movement between the grinding wheel and the work to grind the tooth surfaces of the work, means operable to stop the grinding operation after a grind in all of the tooth spaces of the work, means operable to move said slide to effect relative movement of tool and work between loading and working positions, means for actuating the dresser, and a control member adapted to be advanced step-by-step on operation of each of the three last-named means to control the sequence of operation of the two last-named means.

21. In a machine for grinding gears, a work support, a work spindle journaled in the work support, a tool support, a grinding wheel journaled in said tool support, a slide on which one of said supports is mounted, a dresser for dressing the grinding wheel, means for effecting relative movement between the grinding wheel and the work to grind the tooth surfaces of the work, means operable to stop the grinding operation after a grind in all of the tooth spaces of the work, means operable to increase the depth of grinding engagement of wheel and work, means operable to move said slide to effect relative movement of tool and work between loading and working positions, means for actuating the dresser, and a control member adapted to be advanced step-by-step on operation of any of the four last-named means to control the sequence of operation of the three last-named means.

22. In a machine for grinding gears, a work support, a tool support, a grinding tool mounted on the tool support, a dresser for dressing the grinding wheel, means for effecting relative movement between the grinding wheel and work to grind the tooth surfaces of the work, means operable to stop the grinding operation after a grind in all of the tooth spaces of the work, means operable to increase the depth of grinding engagement of wheel and work, means for actuating the dresser, and a control member adapted to be advanced step-by-step on operation of any of the three last-named means to control the sequence of operation of the two last-named means.

23. In a machine for grinding gears, a work support, a tool support, a grinding tool mounted on the tool support, means for effecting grinding operations in the tooth spaces of the work, means for stopping the grinding operations after a grind in all of the tooth spaces of the work, means operable during stoppage of the grinding operations to move tool and work relatively depthwise so that the depth of grinding engagement may be increased, means also operable during stoppage of the grinding operations to advance the wheel axially and dress the same, control cams adapted to be advanced step-by-step on operation of each of the three last-named means to determine whether one or both of the two last-named operations will be effected during a given period of stoppage, and means for restarting the grinding operations on completion of the predetermined operation or operations during said period of stoppage.

24. In a machine for grinding gears, a work support, a tool support, a grinding tool mounted on the tool support, means for effecting grinding operations in the tooth spaces of the work, means for stopping the grinding operations after a grind in all of the tooth spaces of the work, means operable on stoppage of the grinding operations for effecting relative movement of the work between loading and working position, means operable to dress the grinding wheel while the work is in loading position, means operable during stoppage of the wheel to increase the depth of grinding engagement of wheel and work, control cams adapted to be advanced step-by-step on operation of any of the four last-named means to determine whether all three of the last-named means will be actuated or only the feed-advancing means, and means for restarting the grinding operation on completion of the predetermined operation or operations during said period of stoppage.

25. In a machine for grinding gears, a work support, a tool support, a grinding wheel mounted on the tool support, a slide on which one of said supports is mounted, a dresser, fluid-pressure operated means for moving the slide between loading and working positions, fluid-pressure operated means for advancing the slide independently of said first-named fluid-pressure operated means to increase the depth of engagement of the wheel and work, fluid-pressure operated means for actuating the dresser, a drum having a plurality of cams mounted thereon for controlling the operations of the several fluid-pressure operated means, means for effecting grinding operations in the tooth spaces of the work, means for stopping the grinding operations after a grind in all the tooth spaces of the work, and fluid-pressure actuated means for advancing said drum step-by-step on operation of said stop means or any of the other fluid-pressure operated means.

26. In a machine for grinding gears, a work support, a tool support, a grinding wheel mounted on the tool support, a slide on which one of said supports is mounted, a dresser, means for effecting grinding operations in the tooth spaces of the work, means for moving the slide between loading and working positions, means for advancing the slide independently of said first-named means to increase the depth of engagement of the wheel and work, means for actuating the dresser, a drum having a plurality of cams mounted thereon for controlling the operations of the several described means, a ratchet and pawl mechanism for advancing said drum step-by-step, means for stopping the grinding operations after a grind in all of the tooth spaces of the work, and means for actuating said ratchet and pawl mechanism on operation of the last-named means or of any of the other described means except the first.

27. In a machine for grinding gears, a work support, a tool support, a grinding wheel mounted on the tool support, a slide on which one of said supports is mounted, a dresser, means for effecting grinding operations in the tooth spaces of the work, means for moving the slide between loading and working positions, means for advancing the slide independently of said first-named means to increase the depth of engagement of the wheel and work, means for actuating the dresser, a drum having a plurality of cams mounted thereon for controlling the operations of the several described means, a ratchet and pawl mechanism for advancing said drum step-by-step, means for stopping the grinding operations after a grind in all of the tooth spaces of the work, fluid-pressure operated means for actuating said ratchet and pawl mechanism, a valve for controlling said fluid-pressure operated means, a pair of solenoids for shifting said valve in opposite directions, respectively, and means for alternately energizing said solenoids on operation of any of the four first-named means.

28. In a machine for grinding gears, a work support, a tool support, a grinding wheel mounted on the tool support, means for effecting grinding operations in the tooth spaces of the work, means for stopping the grinding operations after a grind in all the tooth spaces of the work, means operable thereupon to move the work support to loading position, means operable during the periods of stoppage to advance the work relative to the wheel, means also operable during the periods of stoppage to advance and dress the wheel, a control member for determining the sequence of operation of the three last-named means and movable step-by-step on operation of any of the four last-named means, means operable by the control member for restarting the grinding operations on completion of the desired operations during a period of stoppage, and means operable by the control member, on completion of the desired number of grinds, for stopping said machine.

29. In a machine for grinding gears, a work support, a tool support, a grinding wheel journaled on the tool support, means for advancing the work relative to the grinding wheel periodically to increase the depth of grinding comprising a cam having an operative surface at a varying distance from its axis, and means for imparting step-by-step angular motion of said cam about its axis, and adjustable means for predetermining the angle through which the cam is to be rotated by said step-by-step movements.

30. In a machine for grinding gears, a work support, a tool support, a grinding wheel journaled in the tool support, means for producing relative movements between the wheel and work to effect grinding operations on the tooth spaces of the work, means operable periodically to stop said grinding operations, means operable periodically to increase the depth of engagement of the wheel and work, means operable periodically for dressing the grinding wheel, a control member adapted to be advanced step-by-step for determining when said last two-named means will be operated, and means operable by said control member for controlling the rate of dressing.

31. In a machine for grinding gears, a work support, a tool support, a grinding tool mounted on said tool support, means for effecting relative movements between the tool and work to grind in the tooth spaces of the work, means for periodically stopping the grinding operations, a rotary cam for controlling the depth of engagement of tool and work and having a continuous peripheral operating surface at a varying distance from its axis, and means operable on each stoppage except the last in grinding a gear to rotate the cam a step, the total angular movement of the cam in its step-by-step movement during grinding of a gear being less than a revolution of the cam.

WILLIAM C. CRITCHLEY.
HERMAN A. MALE.

REFERENCES CITED

The following references are of record in the file of this patent:

UNITED STATES PATENTS

| Number | Name | Date |
|---|---|---|
| 856,662 | Smith | June 11, 1907 |
| 1,840,088 | Fraser | Jan. 5, 1932 |
| 1,961,849 | Fraser | June 5, 1934 |
| 1,979,870 | Condon | Nov. 6, 1934 |
| 2,130,021 | Neugart | Sept. 13, 1938 |
| 2,196,087 | Staples et al. | Apr. 2, 1940 |
| 2,267,391 | Astrowski | Dec. 23, 1941 |
| 2,387,166 | Miller | Oct. 16, 1945 |
| 2,395,544 | Galloway | Feb. 26, 1946 |
| 2,414,182 | Wessman | Jan. 14, 1947 |
| 2,424,271 | Galloway | July 22, 1947 |

FOREIGN PATENTS

| Number | Country | Date |
|---|---|---|
| 368,843 | Germany | Feb. 10, 1923 |
| 650,470 | Germany | Sept. 23, 1937 |